(12) United States Patent
Fan

(10) Patent No.: US 6,600,850 B1
(45) Date of Patent: Jul. 29, 2003

(54) MEMS OPTICAL SWITCH WITH A NOTCHED LATCHING APPARATUS FOR IMPROVED MIRROR POSITIONING AND METHOD OF FABRICATION THEREOF

(75) Inventor: Li Fan, San Diego, CA (US)

(73) Assignee: OMM, Inc., San Diego, CA (US)

( * ) Notice: Subject to any disclaimer, the term of this patent is extended or adjusted under 35 U.S.C. 154(b) by 330 days.

(21) Appl. No.: 09/697,038

(22) Filed: Oct. 25, 2000

(51) Int. Cl.$^7$ ................................................. G02B 6/26
(52) U.S. Cl. .......................................... 385/18; 385/16
(58) Field of Search ....................... 385/16–18; 310/328

(56) References Cited

U.S. PATENT DOCUMENTS

| | | | | |
|---|---|---|---|---|
| 5,646,928 A | * | 7/1997 | Wu et al. .................... | 359/362 |
| 5,867,297 A | * | 2/1999 | Kiang et al. ............ | 235/462.32 |
| 6,144,781 A | * | 11/2000 | Goldstein et al. ............. | 385/16 |
| 6,166,478 A | * | 12/2000 | Yi et al. ..................... | 310/328 |
| 6,215,921 B1 | * | 4/2001 | Lin .............................. | 385/16 |
| 6,238,580 B1 | | 5/2001 | Cole et al. ....................... | 216/2 |
| 6,243,507 B1 | | 6/2001 | Goldstein et al. ............. | 385/13 |

OTHER PUBLICATIONS

"MUMPs Design Handbook, Revision 4.0", Koester, et al., 1996.
"Process Tutorial", Sandia National Laboratories, Mar. 21, 1999.

* cited by examiner

Primary Examiner—Ellen E. Kim
(74) Attorney, Agent, or Firm—Arien C. T. Ferrell; Aagaard & Balzan, LLP; Eric J. Aagaard

(57) ABSTRACT

In at least one embodiment, the apparatus includes an actuator arm, a mirror structure, and a latch mounted between the arm and the mirror structure. The latch has a first end mounted to the arm and a fastener connected to the mirror structure. The fastener has a fastener support surface and a fastener side surface, where the fastener support surface is in contact with the mirror structure. The fastener support surface and the fastener side surface are angled to each other to define a fastener corner. At the fastener corner is a fastener notch. Likewise, the mirror structure can include a catch for receiving the latch on a substantially flat catch support surface, which is created by a catch notch at the corner of the catch support and side surfaces. In at least one embodiment, the method includes steps of fabrication of the apparatus.

49 Claims, 15 Drawing Sheets

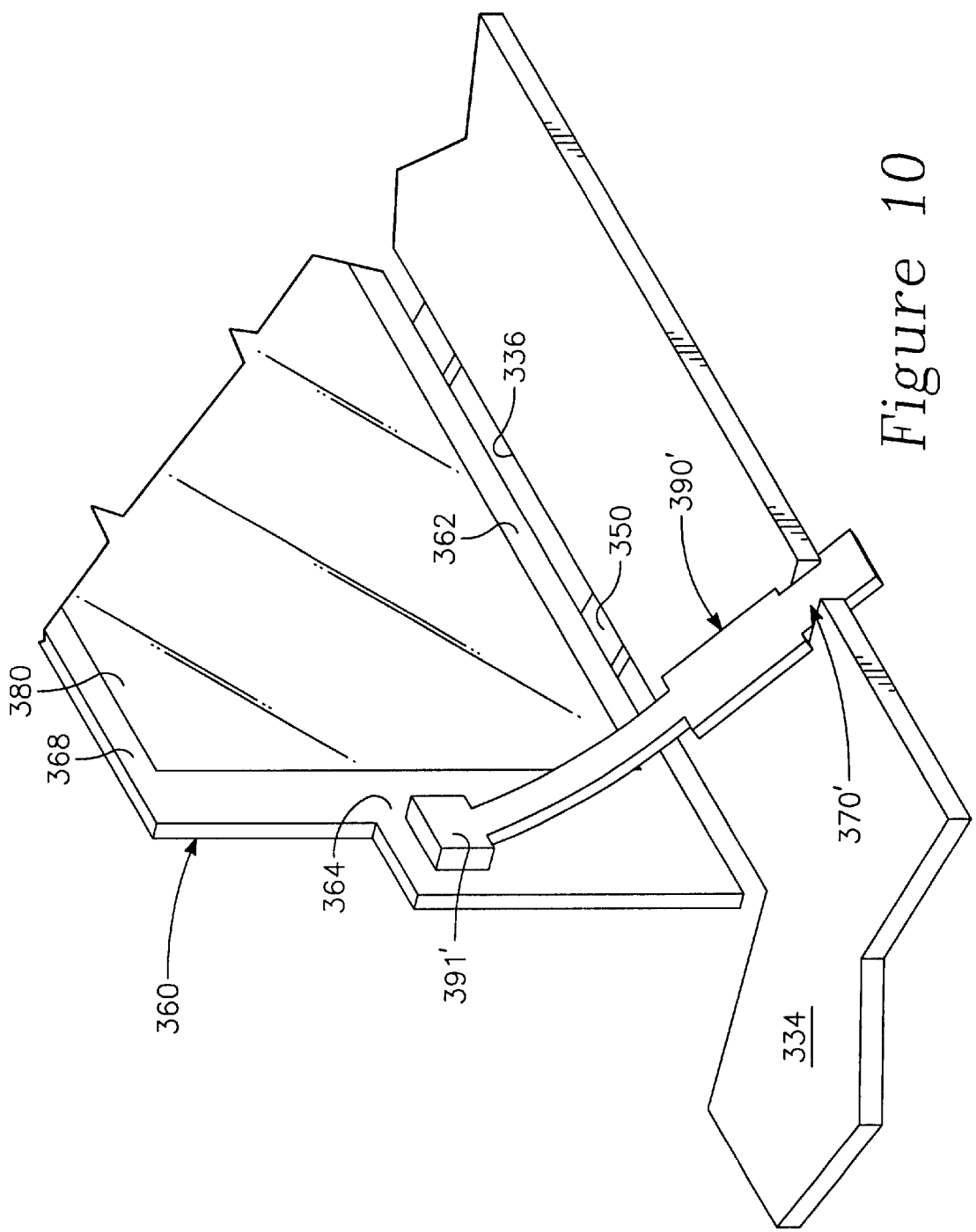

MEMS OPTICAL SWITCH WITH A NOTCHED LATCHING APPARATUS FOR IMPROVED MIRROR POSITIONING AND METHOD OF FABRICATION THEREOF

BACKGROUND

Microelectrical mechanical systems (MEMS) are electromechanical structures typically sized on a millimeter scale or smaller. These structures are used in a wide variety of applications including for example, sensing, electrical and optical switching, and micron scale (or smaller) machinery, such as robotics and motors. Because of their small size, MEMS devices may be fabricated utilizing semiconductor production methods and other microfabrication techniques such as thin film processing and photolithography. Once fabricated, the MEMS structures are assembled to form MEMS devices. The fabrication and assembly of MEMS devices is typically called "micromachining".

For optical switching, structures can be built which have a mirrored surface for reflecting a light beam from a sending input optical fiber to a separate receiving output fiber. By constructing a mirrored surface onto a movable structure, the mirror can be moved in to, or out of, the path of a beam of light. With more than one switch aligned in the beam path, the beam can be directed to one of several receiving fibers. These types of structures are generally known as "optomechanical switches".

Optomechanical switches can employ any of a variety of configurations. One configuration commonly used is a pop-up or flip-up mirror, as shown in FIG. 1. In a pop-up mirror switch 100, the mirror 120 is attached to a structure 130 which allows the mirror to be moved from a lowered position, where the mirror is held out of the beam of light B1 (as shown by the dashed lines), to a raised position, where the mirror has been rotated up into the beam B1 (as shown by solid lines). As can be seen, the mirror 120 rotates about a hinge 140 when being moved between the lowered and raised positions. The hinge 140 is positioned at the surface 110 of the switch 100. The mirror is raised by actuators 150. In its raised position, the mirror 120 is at an angle A1 to the beam B1.

It has been found that pop-up mirrors like that shown in FIG. 1, generally have difficulties keeping the angle A1 within the necessary tolerances. This is especially true the more the switch 100 is used. Maintaining the alignment of the mirror with the light beam is critical to the operation of any such mirror. Changing the mirror position, even a few tenths of a degree, can result in the reflected beam failing to be sufficiently aligned with the receiving fiber. That is, if the mirror is positioned at an angle which is outside its operating limits, the light beam will no longer be properly aligned with the receiving fiber, and as such, the reflected beam will not continue to the receiving fiber. This will cause not only the specific switch to fail, but will effectively make the entire switching device (i.e. an array of switches) useless.

Another problem with pop-up mirrors has been the inherent limited displacements provided by the comb (lateral) actuators they use. Sufficient displacement is critical as it is necessary to move the pop-up mirror completely into and out of the path of the light beam.

Another actuator which has been used with pop-up mirrors are scratch drive actuators. While these types of actuators can provide longer travel distances, they have large contact areas which are susceptible to stiction and charging. This causes repeatability problems in long term cycling.

To overcome the inherent problems of pop-up mirrors, switches have been constructed which position the mirror in a fixed upright position and move the mirror vertically into and out of the light beam. An example of such a switch is shown in FIG. 2. As can be seen, the switch 200 has a mirror 220, an actuator structure 230 and an actuator hinge 240. The switch 200 is positioned on surface 210. The mirror 220 is attached to the actuator structure 230 at a mirror hinge 260 and is supported by a latch 270. With the switch 200 in the lower position, the mirror 220 is held down near the surface 210 and in the light beam B2. Then, when the switch 200 is in its upward position, the mirror 220 is raised up out of the light beam B2.

In this configuration, the mirror 220 is kept in a position where the angle A2 of the mirror relative to the beam B2, is kept constant as the mirror 220 is moved from its raised position to its lowered position. This provides the advantage that, unlike with the pop-up switches, the angle A2 is not changed during the operation of the switch 200. This keeps angle A2 from departing from its allowable range during repetitive use of the switch. As such, the likelihood of failure of the switch due to misalignment of the mirror is greatly reduced.

As shown in FIG. 2, the mirror 220 is supported and held in place by the latch 270. During construction of the switch 200 the mirror 220 is raised from a horizontal position by rotating the mirror 220 about the hinge 260. The mirror 220 is retained in its upright or vertical position with latch 270. A typical configuration for latch 270 is shown in FIG. 3.

As set forth in FIGS. 2, 3a and b, the latch 270 has cut-outs 272 which are received in the catches 222 of the mirror 220, when the mirror is raised up to its operating position. As further shown in the enlarged view in FIG. 4, the engagement of catches 222 with cut-outs 272 causes the mirror 220 to become "locked" into a fixed vertical position relative to the actuator structure 230. The positioning of the cut-outs 272 along the length of the latch 270 will determine the angle of the mirror relative to the actuator structure 230 and consequently will determine the angle A2 of the mirror relative to the light beam B2.

Unfortunately, mirrors and latches with cut-outs, as shown in FIGS. 2–4, have had relatively large variations in the positioning of the mirror from switch to switch. These variations have resulted in corresponding variations in the angle of the mirror relative to the light beam. As a result, these switches have had a high occurrence of failures from improper alignment of the reflected light beams with the receiving fibers. The variations in the mirror positioning are due to the fact that there exists a relatively large range in the possible location of the contact points between the latch and the mirror structure. That is, the location where the mirror structure contacts the latch varies from switch to switch.

As shown FIG. 4, both the cut-out 222 of the mirror 220 and the cut-out 272 of the latch 270 have rounded corners 224 and 272, respectively. With rounded corner 224 contacting rounded corner 274, a large variation of the possible location of the contact point between the corners exists. As noted above, this positional range of the contact point produces a corresponding range in the possible positioning angle of the mirror 220.

The rounded corners 224 and 274 are produced when each device is etched during fabrication. When etching small corners, particularly small inside corners, of small thin film structures, rounded corners typically result.

As a result, the angle A2 of the mirror relative to the beam B2, can vary significantly, as shown in FIG. 2. Thus, there exists a corresponding large range in the positioning of the reflected beam B2'. This, in turn, causes a greater number of switches to fail since the reflected light beam B2' is not properly aligned with the receiving optical fiber. With the reflected beam B2' so misaligned, the receiving fiber cannot further transmit the light beam. That is, the misalignment of the reflected beams B2' due to the rounded corners 224 and 274, causes failure of not just the particular misaligned switch, but effectively the failure of the entire optical switching device.

Therefore, a need exists for an apparatus which couples mircomachine structures together more precisely and which minimizes the range of possible positions between coupled structures.

SUMMARY

In at least one embodiment, a thin film structure having a first structure, a second structure, and a latch mounted therebetween. The latch has a first end mounted to the first structure and a fastener connected to the second structure. The fastener has a fastener support surface and a fastener side surface, where the fastener support surface is in contact with the second structure. The fastener support surface and the fastener side surface are angled toward each other to define a fastener corner.

At the fastener corner is a fastener notch. The fastener notch functions to remove the curved corner which would otherwise be produced during the fabrication of the fastener corner. The removal of a curved corner at the fastener corner produces a substantially flat fastener support surface. The flat surface of the support surface improves the accuracy of the positioning of the connection of the latch to the mirror structure. This is because the contact point is no longer located on a curved surface which in prior devices can cause the location of the contact point to vary from connection to connection. Increasing the accuracy of the positioning of the contact point provides the distinct advantage that, the positioning of the mirror placed on the second structure, will be positioned with much greater precision. This, in turn, improves the alignment of the reflected light beam with the receiving optical fiber. The result is a great reduction in the likelihood of device failure due to beam misalignment. As such, a significant increase in production yield is achieved with the present invention.

For additional mirror positioning accuracy, the second structure can include a notched catch for receiving the latch. The catch has a catch support surface and a catch side surface. The catch support surface functions to receive the latch. The catch side surface and the catch support surface are angled to each other to define a catch corner. A catch notch is positioned at the catch corner, preferably on the catch support surface at the catch side surface.

As with the notch in the fastener, the notch of the catch functions to remove the structure at the catch corner, and as such, provides a substantially flat catch support surface. Since the catch support surface contacts the latch, the present invention's more uniform support surface allows the second structure to be positioned with greater accuracy.

A preferred embodiment of the apparatus of the present invention is a MEMS optical switch having an actuator arm, two latches, a mirror hinge and a mirror structure.

The actuator arm is mounted on an actuator hinge so that it can be actuated up and down to move a mirror positioned on the mirror structure up and down, thus in and out of the beam of light. The latches are mounted to the actuator at a first end (opposite the actuator hinge) and each extend out to two fasteners on each latch. The fasteners are separated by a center portion. Each fastener has a fastener support surface and a fastener side surface. The fastener support surface functions to receive the mirror structure. The fastener support surface and the fastener side surface are angled to each other to define a fastener corner. The fastener corner has a fastener notch positioned on the fastener support surface at the fastener side surface. Because of the notch, the fastener support surface is substantially flat. A mirror hinge connects the actuator arm to the mirror structure.

The mirror structure is positioned at an angle to the actuator arm, preferably about 90 degrees. The mirror structure has the mirror on its surface and has two catches on either side of the mirror. The each catch receives a respective latch at the latches' fasteners, securing the mirror structure in a fixed position relative to the actuator arm. Each catch has a catch support surface and a catch side surface. The catch support surface and the catch side surface are angled to one another forming a catch corner. Each catch corner has a catch notch positioned on the support surface at the side surface. The notch functions to remove the structure at the corners and in so doing makes the support surface flat. The latches are received on the flat catch support surface. The catch support surface is positioned between two catch side surfaces forming a trench. The trench receives the center portion of the latch. Forming the catch side surfaces are shoulders, one of which is located on each side of the catch support surface. The shoulders function to receive the flat fastener support surfaces.

In the preferred embodiments the apparatus is a polycrystalline silicon. The actuator arm and mirror structure are about 1.0 $\mu$m and the latch is about 1.5 $\mu$m thick.

The method of the present invention includes: providing the actuator arm and mirror structure, forming a sacrificial layer with a via to the actuator arm, forming a latch having a fastener with a notch and which is connected to the arm through the via, removing the sacrificial layer, moving the mirror structure relative to the actuator arm, and engaging the latch, at its fastener, with the mirror structure. For greater mirror positioning accuracy, the method can also include forming a notched catch.

In the preferred embodiments of the method, additional steps are included. Namely, the step of providing a first structure and a second structure includes forming a first structural layer and etching the first structural layer to define the first structure and the second structure. The step of forming a latch includes forming a second structural layer and etching the second structural layer to define the latch. Before forming the first structural layer it is preferred that the steps of providing a substrate, forming a poly 0 layer, etching the poly 0 layer, forming a lower oxide layer, and etching the oxide layer to form lower layer vias to the poly 0 layer.

BRIEF SUMMARY OF THE DRAWINGS

FIG. 10 is an isometric view of a portion of a mirror structure and a latch member in accordance with an embodiment of the present invention.

DETAILED DESCRIPTION OF PREFERRED EMBODIMENTS OF THE INVENTION

The present invention is embodied in a notched latching mechanism apparatus and a method of fabricating the same. In one embodiment, the invention includes a latch with notched fasteners and a mirror structure with notched catches. The latch notches are located near where the latch interconnects with a mirror structure. Likewise, the catch notches are positioned at the corners of the catch which receives the latch member.

An advantage of some embodiments the present invention is greater accuracy in the positioning of the mirror. This improved positioning dramatically reduces the potential for misalignment of the reflected light beam with the receiving optical fiber. As an example, in some embodiments, the present invention has reduced variations in mirror positioning to substantially less than ±0.1 degrees. Generally, the present invention provides 5–10 times more accurate positioning than prior devices. This improved positioning accuracy in turn provides a much lower rate of loss of devices during fabrication.

Figure 1:
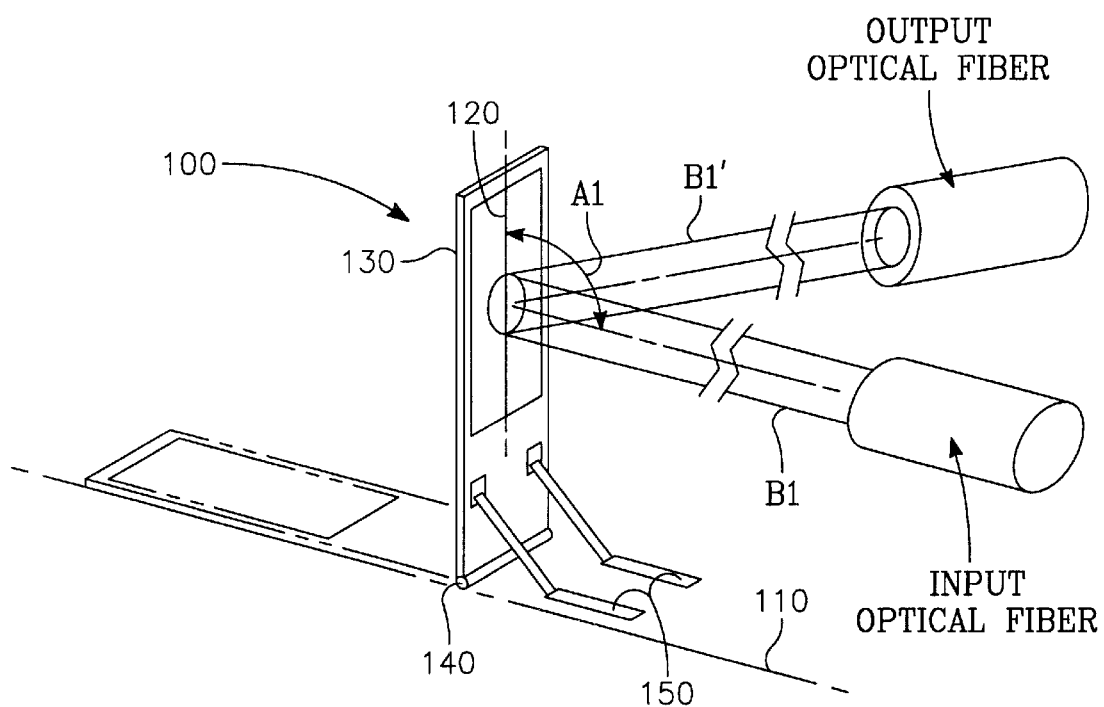
FIG. 1 is an isometric view of a pop-up mirror.
Figure 2:
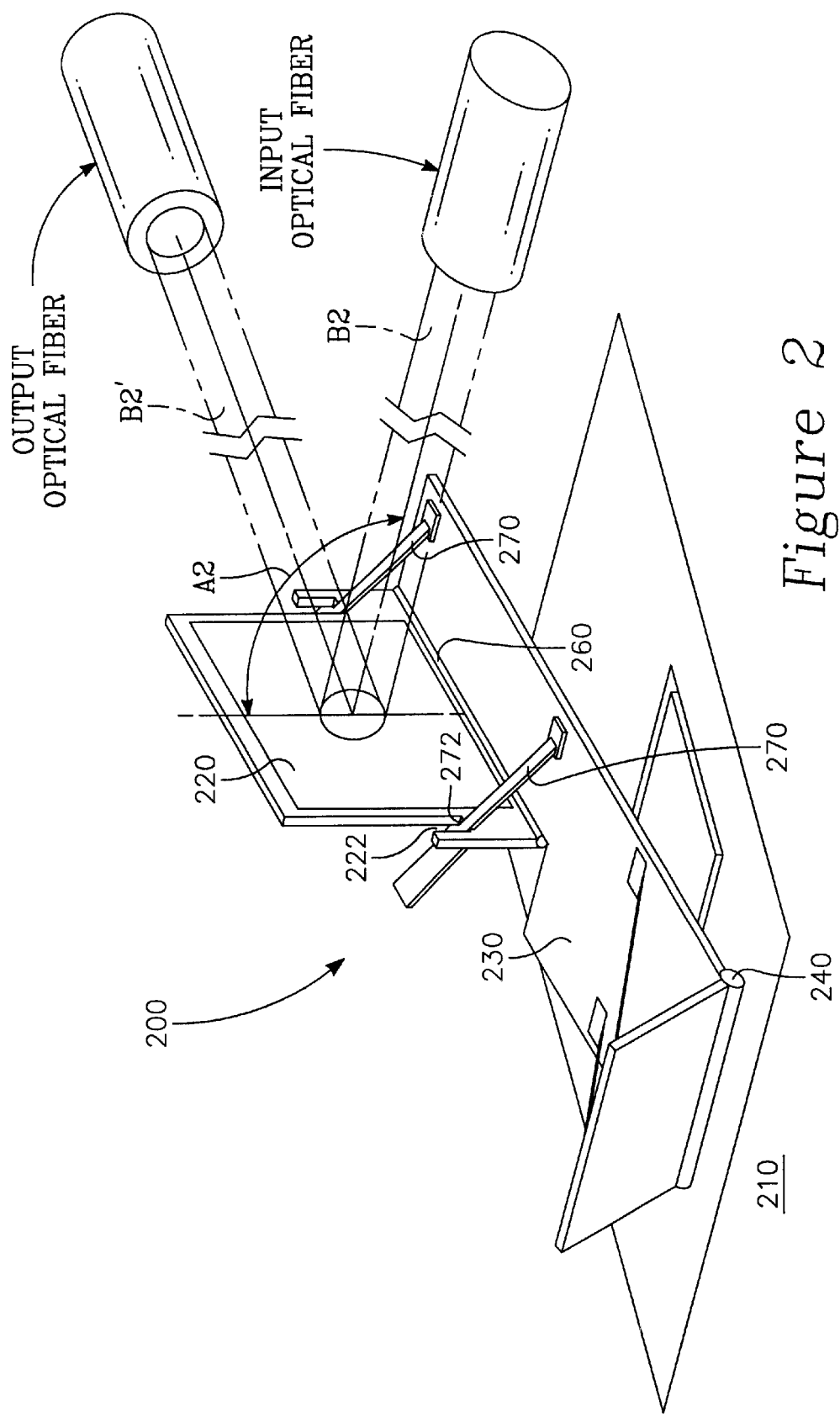
FIG. 2 is an isometric view of an optical switch.
Figure 3A:
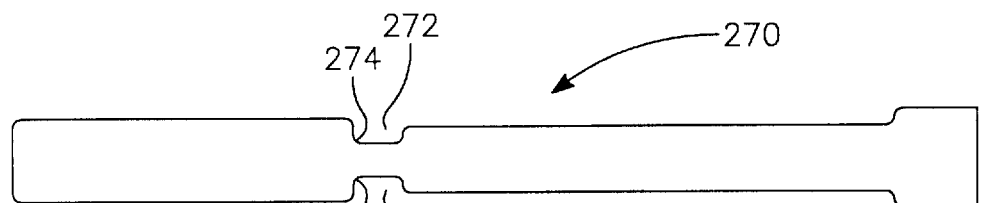
FIGS. 3a and b are frontal views of a latch member and a portion of a mirror structure.
Figure 3B:
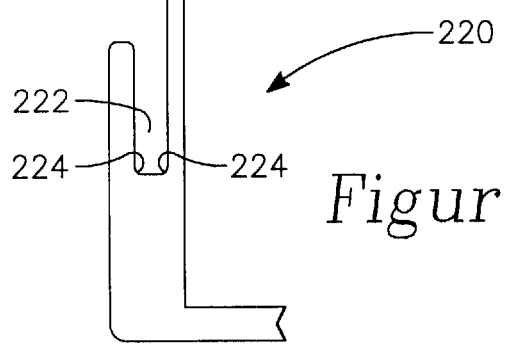
Figure 4:
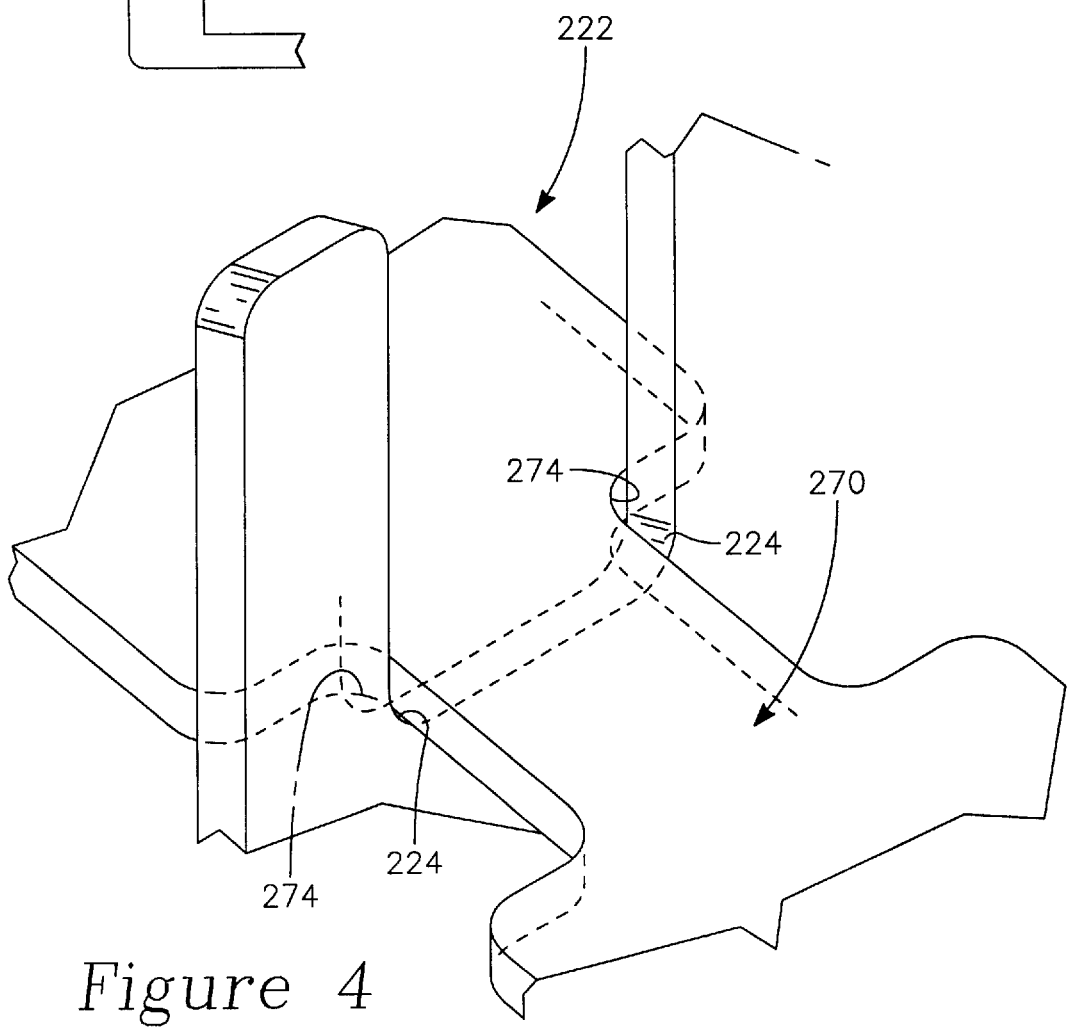
FIG. 4 is an isometric view showing a portion of a latch and mirror structure connection.

This improved positioning advantage is achieved by eliminating the rounded corners (rounding area) at the connecting points between the mirror structure and latches of the prior devices. These rounded corners where located were the fasteners and catches contacted each other, as shown in FIGS. 3 and 4. Since the rounded corners allow a relatively large range of possible positions of the contact points between the latch and the mirror structure, the resulting position of the mirror would vary greatly from device to device.

Figure 6:
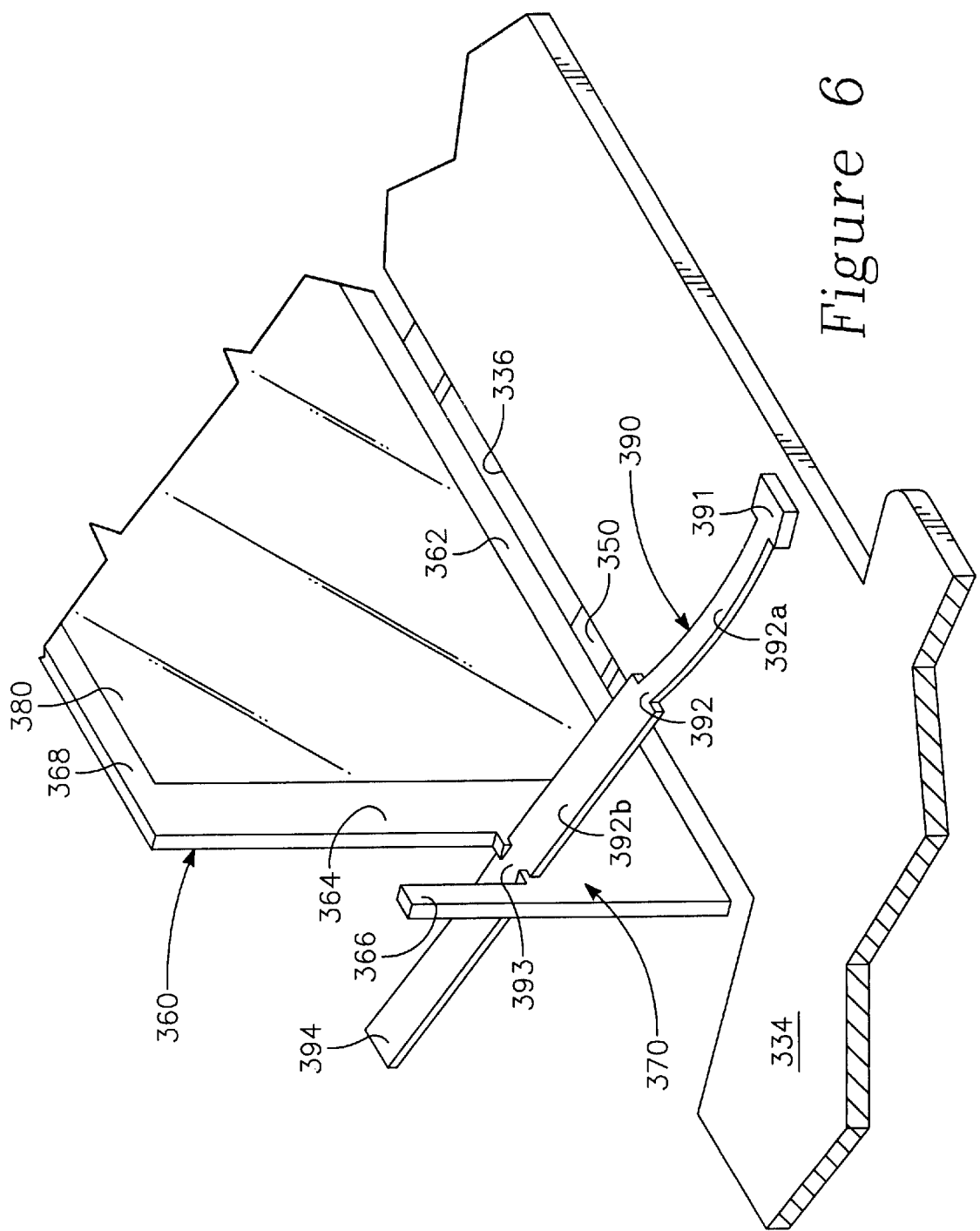
FIG. 6 is an isometric view of a portion of an optical switch in accordance with an embodiment of the present invention.
Figures 7, 8:
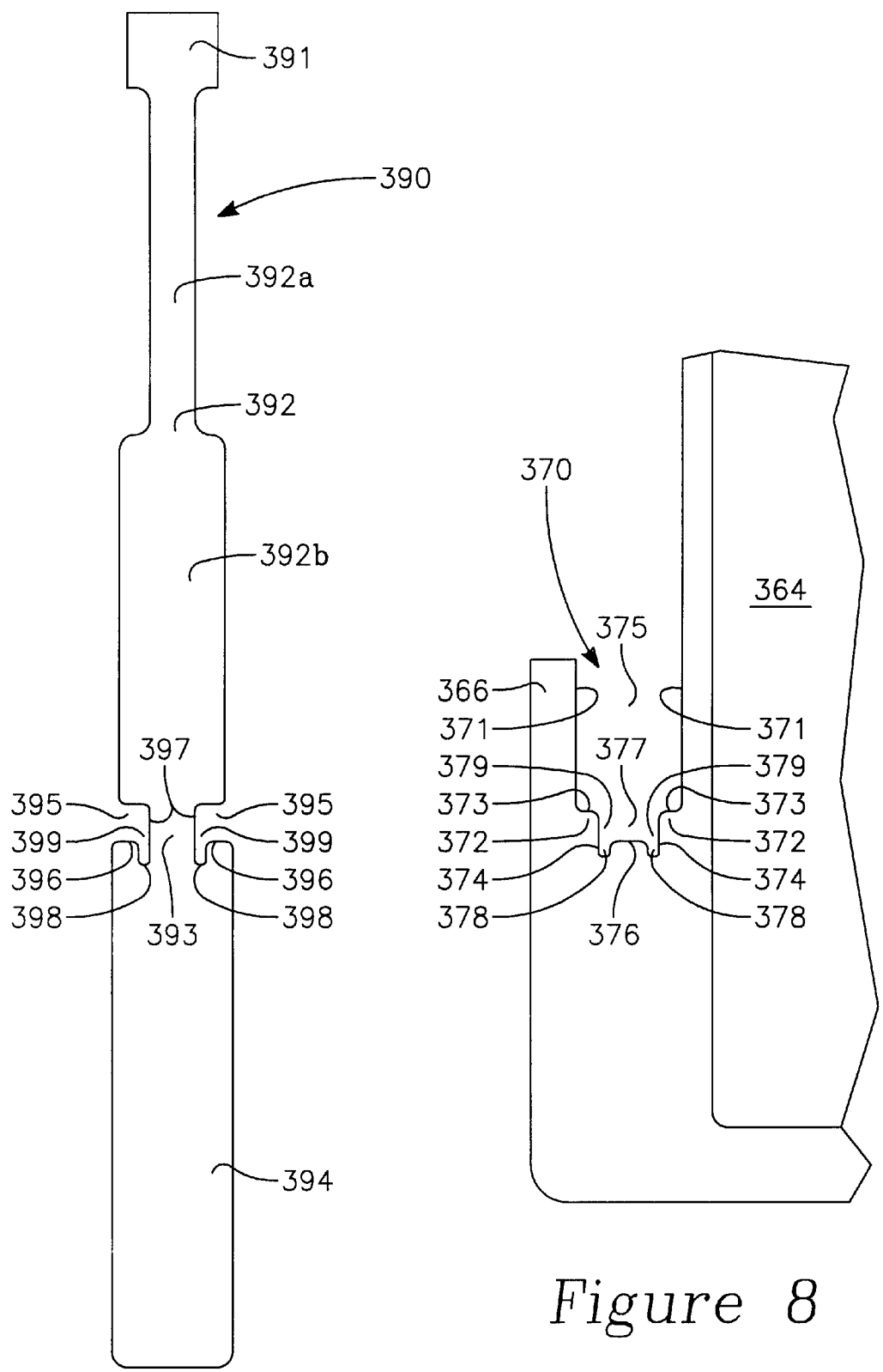
FIG. 7 is a frontal view of a latch in accordance with an embodiment of the present invention.
FIG. 8 is a frontal view of a portion of a mirror structure in accordance with an embodiment of the present invention.

In some embodiments of the present invention, the rounded corners are removed by placing a notch at each corner. Such notches are shown in FIGS. 6–8, with FIG. 8 showing the interconnection of a fastener and a catch. Although the resulting structure is not a true corner, as one edge never directly intersects with the other edge (the notch preventing this), the resulting structure functions as a corner. So long as the latch being received is sufficiently larger than the notch itself, the latch will extend over the notch and can contact the side of the corner.

While rounded corners still result from the etching of the corners, the rounded corners are within the notch. Thus, the rounded corners are recessed or removed from contact with the respective latch or catch. The addition of the notches allow the catches to function as if they had squared corners. As such, use of the notched corners permit the position of the contact points between the connected structures to be defined with significantly more precision.

This greater precision can allow significantly improved mirror positioning. Which, in turn, reduces the possibility of failure caused by misalignment of the reflected light beam with the receiving optical fiber.

Some Embodiments of the Apparatus of the Invention

Figure 5:
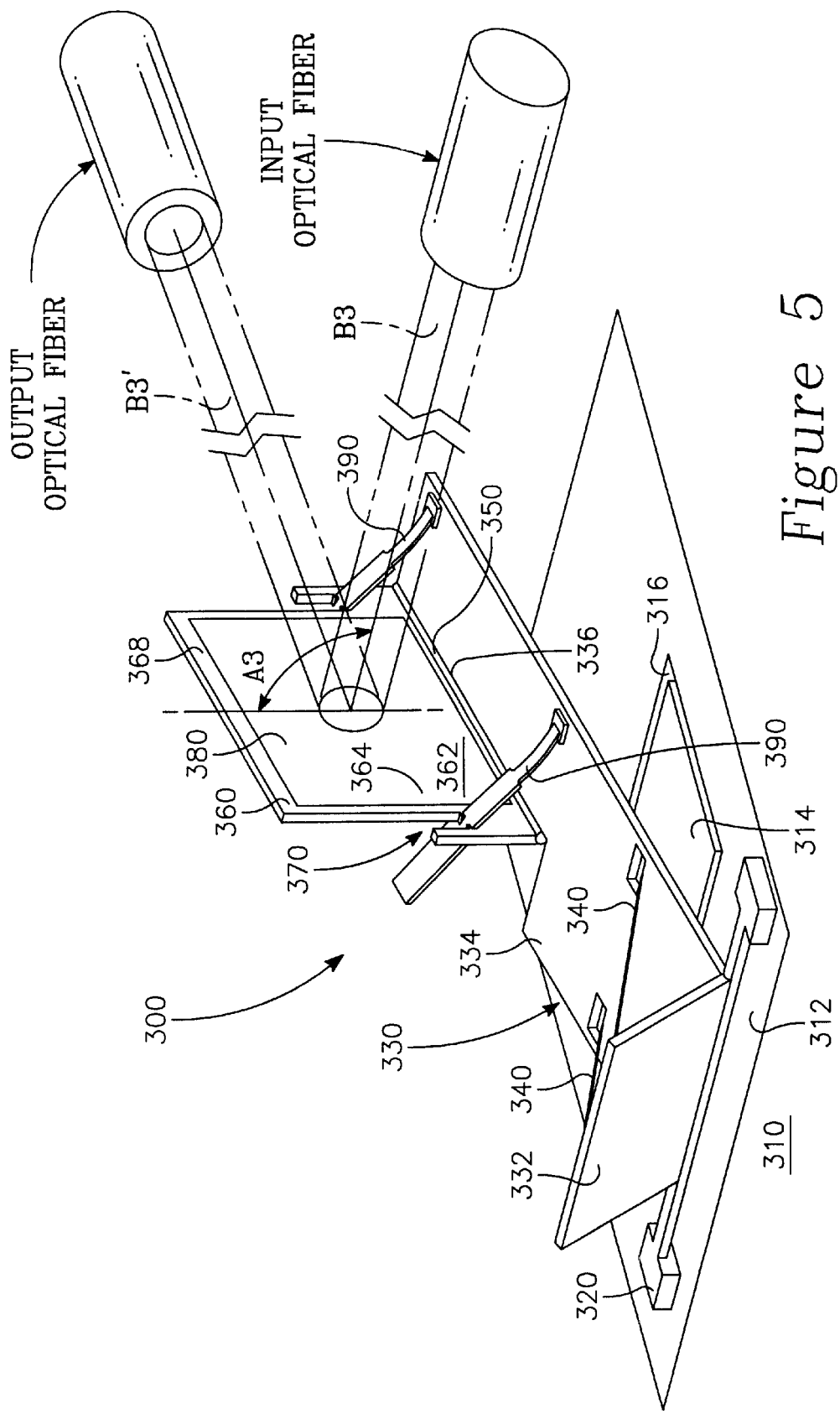
FIG. 5 is an isometric view of an optical switch in accordance with an embodiment of the present invention.

The apparatus of the invention can have any of a variety of embodiments. As shown in FIG. 5, in one embodiment, the apparatus of invention is a switch 300. The switch 300 includes a surface 310, an actuator arm hinge 320, an actuator arm 330, an actuator latch 340, a mirror hinge 350, a mirror structure 360, catches 370, a mirror 380, and mirror latches 390.

An example of an actuator hinge is set forth in U.S. patent application Ser. No. 09/697,762, entitled MEMS OPTICAL SWITCH WITH TORSION HINGE AND METHOD OF FABRICATION THEREOF, by Li Fan, filed on Oct. 25, 2000, which is hereby incorporated by reference in its entirety. An example of an actuator is set forth in U.S. patent application Ser. No. 09/697,037, entitled MEMS OPTICAL SWITCH WITH SHIELD PROVIDING REDUCED LIKELIHOOD OF SHORTING AND METHOD OF FABRICATION THEREOF, by Li Fan, filed on Oct. 25, 2000, which is hereby incorporated by reference in its entirety. An example of a stopper is set forth in U.S. patent application Ser. No. 09/697,767 entitled MEMS MICROSTRUCTURE POSITIONER AND METHOD OF FABRICATION THEREOF, by Li Fan, filed on Oct. 25, 2000, which is hereby incorporated by reference in its entirety.

Preferably, the components of the switch 300 are constructed on and, for some components between, a poly 0 layer 420, a poly 1 layer 440 and a poly 2 layer 460, as shown in FIGS. 10 and 11 and discussed in detail herein. The poly 0, poly 1 and poly 2 layers may be formed of a polycrystalline silicon.

Returning to FIG. 5, the switch 300 can be moved from a lowered position to a raised position. In the lowered position, the switch 300 is typically positioned to be in the path of the beam of light B3. The light beam B3 is reflected by the mirror 380 as a reflected beam B3', to a output optical fiber (or other device) when the switch 300 is in its lowered position. When moved to its raised position, the switch 300 lifts the mirror 380 out of the path of the light beam B3. In this manner, the light beam B3 can be switched from either continuing straight past the switch 300 or being reflected at a predefined angle. After passing the switch 300, the beam of light, whether reflected or not, can continue on to another switch, a receiving fiber, a sensor, or any other similar component. The switch 300 can also be configured to reflect the light beam when in its raised position and be out of the light beam when in its lowered position.

The switch 300 may be made of a poly silicon material. Alternative materials include any thin film material including conductive and non-conductive materials, single crystal silicon and oxide materials. However, poly silicon generally provides greater strength and flatter and more uniform structures than the other possible materials.

The switch 300 moves between its lowered and raised positions by actuating the actuator arm 330 about the arm hinge 320. As seen in FIG. 5, the actuator arm 330 includes a backflap 332 and a main arm portion 334. The mirror 380 is mounted at the end of the main arm 334. The backflap 332 and the main arm 334 are connected at the arm hinge 320 and by the actuator latches 340. The backflap 332 and the main arm 334 are set at a fixed angle relative to each other.

As shown in FIG. 5, the actuator arm 330 must be at least thick enough to have sufficient structural support to carry the mirror 380, and operate without excessive deflection or failure. The exact thickness will vary depending on the specifics of the use and the properties of the material used. The actuator arm 330 should be made of a conductive material so that a charge can be applied to actuate the arm 330. In one embodiment, the actuator arm 330 is a doped polycrystalline silicon having a substantially uniform thickness of about 1.0 $\mu$m. The main arm 334 typically has a length of about one millimeter from the end of the backflap 332 to the opposing end of the main arm 334. The actuator arm 330 is constructed from the poly 1 layer 440, as shown in FIGS. 10 and 11, as discussed below.

The actuator arm hinge 320 is mounted between the actuator arm 330 and the surface 310. The hinge 320 functions to allow the actuator arm 330 to rotate freely relative to the surface 310. Depending on the use, the hinge 320 can be configured to provide a biasing force onto the arm 330 to urge the arm 330 to a desired position. For example, the hinge 320 can urge the actuator arm 330 either toward or away from the surface 310. The hinge 320 is built from the poly 1 layer 440 and is connected to the poly 0 layer 420, shown in FIGS. 10 and 11, and as discussed below.

As shown in FIG. 5, the surface 310 can include a shield 312 and an surface electrode or actuator 314. The shield 312 is typically positioned near or about the actuator 314 and is connected to the actuator arm hinge 320. The actuator 314 is typically shaped as a pad positioned directly beneath the actuator arm 330. Opposite charges (e.g. different electrical potentials) can be placed on the actuator 314 and the actuator arm 330 (through the shield 312), so that they can be set to attract one another. With the actuator 314 and the arm 330 charged to attract each other, the arm 330, having the mirror 380 attached thereto, is lowered vertically so that the mirror 380 is slid into the path of the light beam B3. This allows the mirror 380 to reflect the light beam B3 while the mirror 380 is kept, throughout its movement, at a substantially constant angle A3 relative to the light beam B3. This constant angle provides increased accuracy of the pointing of the reflected light beam, since the mirror is not subject to the positioning errors found in pop-up mirrors or other such structures.

The surface 310 can be constructed of any suitable well known thin film material including polycrystalline silicon or oxide materials. As discussed above, a doped polycrystalline silicon can be used. Further, the surface 310 may be constructed on the poly 0 layer 420 of the device, as shown in FIGS. 10 and 11 as set forth in detail herein.

To allow the switch 300 to be operated properly, the shield 312 and the actuator 314 should be configured to be electrically insulated from one another, As shown in FIG. 5. Preferably, this is accomplished by etching a trench 316 between the shield 312 and the actuator 314, such that an air gap exists to insulate the components from one another.

Near the end of the main arm 334, opposite the end connected to the arm hinge 320, is mounted the mirror hinge 350. The mirror hinge 350 is positioned between the main arm 334 and the mirror structure 360. In this embodiment, the hinge 350 is positioned adjacent the edge 336 of the arm 334. The hinge 350 allows the mirror structure 360 to be rotated from a substantially horizontal position, to a generally vertical position, during fabrication of the switch 300. After the switch 300 is fabricated, the mirror structure 360 does not further move about the hinge 350. That is, after fabrication of the switch 300, the hinge 350 merely acts to keep the base of the mirror structure 360 connected to and in a constant position relative to, the actuator arm 330.

Like the actuator arm 330, the mirror hinge 350 may be constructed in the poly 1 layer 440 and is of a polycrystalline silicon material, as shown in FIGS. 10 and 11 and as set forth herein in further detail. Returning to FIG. 5, the mirror hinge 350 can be of any of a variety of configurations so long as is sized to allow it to be deformed as the mirror structure 360 is raised and thereafter maintain the mirror structure 360 attached to the actuator arm 330.

The mirror structure 360 is attached to the actuator arm 330 at the mirror base 362 by the mirror hinge 350, and at its sides 364 by the latches 390. As noted above, the mirror structure 360 is held in a fixed position and angle relative to the actuator arm 330 and thus at a fixed angle A3 relative to the light beam B3. Although the mirror 380 can be set at any of a variety of fixed angles, it is preferred that the mirror 380 be set at substantially 90 degrees vertically to the actuator arm 330 and to the light beam B3.

The mirror structure 360 also functions to provide a sufficiently smooth surface for the mirror 380, which is mounted over a front surface 368 of the mirror structure 360. Although it can be any of a variety of sizes, the mirror structure 360 must be at least large enough to support a mirror which is sized to reflect a light beam of a given size. In some embodiments, the mirror structure 360 is about 300 $\mu$m tall and 400 $\mu$m wide. The mirror structure 360 must further be sufficiently thick to support the mirror 380 and provide sufficient rigidity to prevent excessive deformation of the mirror 380. The mirror structure 360, being made from the poly 1 layer 440 as shown in FIGS. 10 and 11 and discussed below, may be a polycrystalline silicon with a thickness of about 1.0 $\mu$m.

As shown in FIG. 5, over the front surface 368 of the mirror structure 360 is the mirror 380. The mirror 380 can be of any well known sufficiently reflective material for a desired transmission frequency, such as aluminum, copper, silver or gold. However, in one embodiment the mirror 380 is made of gold to reflect infrared frequencies. Gold provides the advantage that it is compatible with HF chemical releasing. The mirror 380 can be of any size and shape so long as it fits onto the mirror structure 360 and is large enough to reflect all, or at least a sufficient amount, of the light beam. Preferably, the mirror is large enough to reflect all of the light beam B3. In at least one embodiment of the apparatus, the mirror is about 300 $\mu$m tall and about 400 $\mu$m wide.

As shown in FIG. 6, at the sides 364 of the mirror structure 360 are guides 366 and catches 370. FIG. 6 shows a portion of the actuator arm 330 and the mirror structure 360, with only one side 364 shown. The guides 366 are used to guide the latch 390 into position when the mirror structure is raised to its upright position during fabrication. The guides 366 are elongated narrow beams which extend from the catches 370 out along a path generally defined by the desired movement of the latch 390 as the switch 300 is constructed. The guides 366 can vary in width, length and thickness. However, the guides 366 must be wide enough to support loads generated if the latches 390 attempt to slide off the catches 370. Also, the guides 366 must be long enough to retain the latches 390 behind the guides 366 when the mirror structure 360 is raised underneath the latches 390. Also, to simplify fabrication, the guides 366 are preferably the same thickness as the rest of the mirror structure 360, that is about 1.0 $\mu$m. The actual shape the guides 366 can vary but it is preferred that the inside edge is kept generally straight to facilitate movement of the latches 390 along the guides 366.

As the mirror structure 360 is raised up from a horizontal position to an upright or vertical position, the catches 370, which are initially positioned underneath the latches 390 when the mirror structure 360 is in the horizontal position, move up to contact the latches 390. With the catches 370 contacting the latches 390, the guides 366 extend from the catches 370 out past and over the latches 390. This causes the guides 366 to direct the latches 390 into along the catches 370. Having a latch 390 slide off a catch 370 could result in a failure of device as the mirror 380 most probably would not be positioned properly.

Therefore, as the mirror structure 360 is raised into position, the guides 366 each operate to maintain the latches 390 positioned over their respective catches 370 until the latches 390 engage each catch 370 and the mirror structure 360 is locked into its upright position.

As shown in FIG. 7, each latch 390 includes an anchor 391, an inboard portion 392, a center portion 393, an outboard portion 394 and fasteners 395. These portions of the latch 390 are described in more detail herein.

Figure 9:
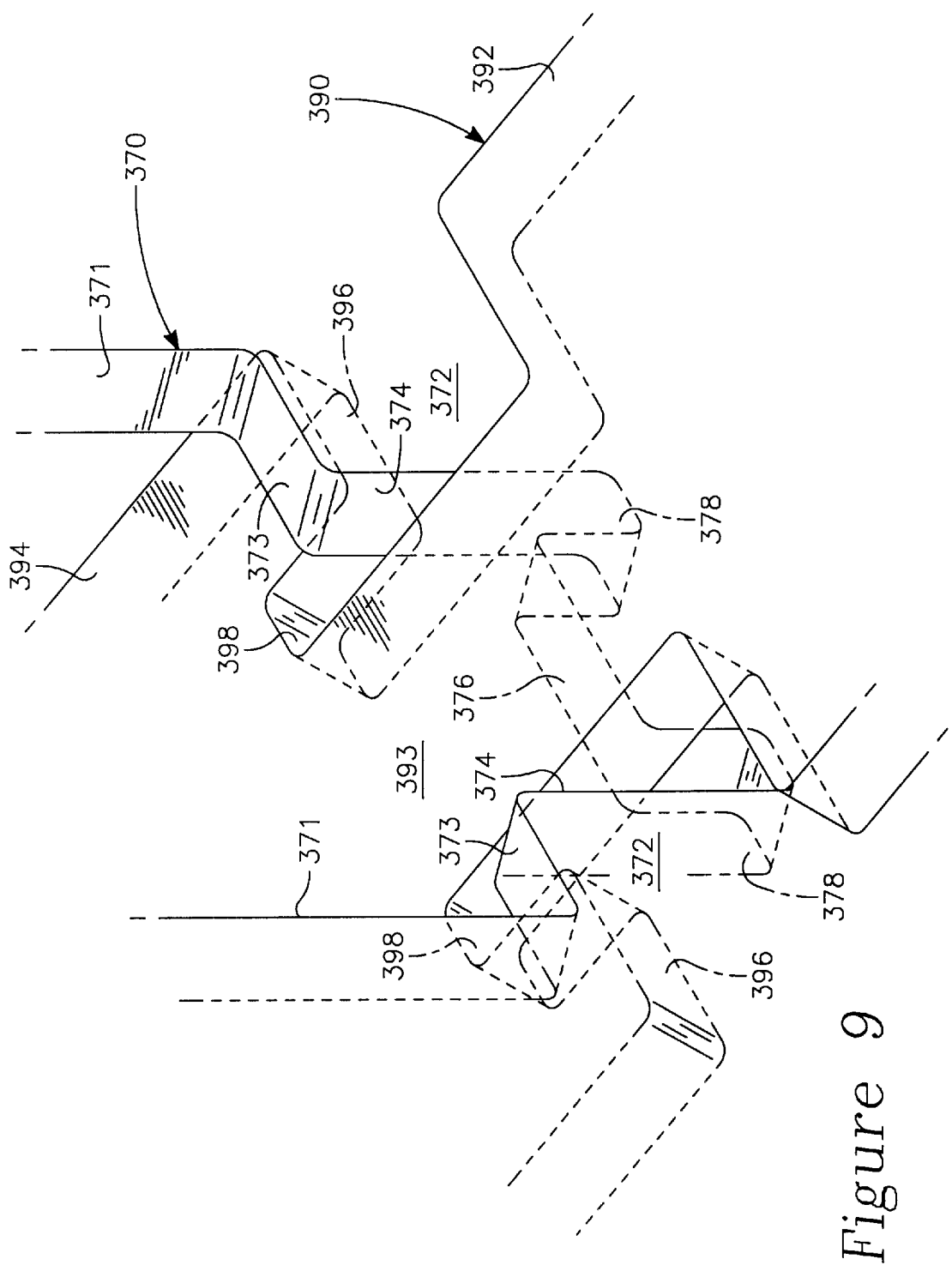
FIG. 9 is an isometric view of portions of a mirror structure and a latch member in accordance with an embodiment of the present invention.

Each side 364 of the mirror structure 360 has a catch 370, as set forth in FIG. 8. The catches 370 function to receive fasteners 395 of the mirror latches 390 (as shown in FIG. 9). Each catch 370 includes walls 371, shoulders 372, shoulder upper edges 373, shoulder side edges or side surfaces 374, upper trench 375, bottom or support surfaces 376, lower trench 377 and notches 378.

The walls 371 of the catch 370 function to keep the latch 390 (shown in FIG. 7) positioned centered over the lower trench 377 as the outboard portion 394 (not shown) moves over the upper edges 373. The walls 371 can vary in their width apart from one another, but they must be at least wide enough to allow the outboard portion 394 to fit between them. As can be seen in FIG. 8, the outboard wall of the walls 371 is positioned on the upper trench 375 side of guide 366.

The upper edges 373 are positioned contacting and generally perpendicular to the walls 371. The walls 371 and the upper edges 373 define the upper trench 375. As the mirror structure 360 is raised to complete fabrication, the outboard portion 394 (not shown) of the latch 390 (not shown) is received into the upper trench 375, resting on the upper edges 373. Then, the outboard portion 394 slides over the upper edges 373 as the mirror structure 360 is raised up to its upright position during fabrication. Preferably, the upper edges 373 are generally smooth so as to facilitate the movement of the outboard portion 394.

During the raising of the mirror structure 360, as the fasteners 395 (not shown) of the latch 390 (not shown) reach the catches 370, the latch 390 will drop below the upper edges 373 to contact the bottom 376. In this position, the latch 390 is held in position behind the shoulders 372. This is shown in FIG. 9.

Returning to FIG. 8, the shoulder side edges 374 extend vertically from the upper edges 373 to the bottom 376. The side edges 374 and the bottom 376 define the lower trench 377. The opposing side edges 374 can vary in their distance apart but it is preferred that they are wider apart than the center portion 393 of the latch 390 and narrower than the width between the walls 371. This allows the center portion 393 to be received between the side edges 374, and drop down into the lower trench 377 to contact the bottom 376. The side edges 374 must also extend enough to allow the lower trench 377 to be sufficiently deep that the fasteners 395 are adequately received within the lower trench 377. This allows the latch 390 to be locked to the mirror structure 360, as shown in FIG. 9.

As shown in FIGS. 8 and 9, the bottom 376 is set between the side edges 374 and functions to receive the center portion 393 of the latch 390. The center portion 393 will be so received when the mirror structure 360 is raised to its upright position and the center portion 393 is moved over the lower trench 377. In order to achieve the desire high degree of accuracy of the positioning of the mirror structure 360, it is preferred that the bottom 376 is substantially flat and even. This allows the latch 390 to be positioned in the same location for each fabrication of the mirror structure/latch connection.

As shown in FIG. 8, positioned where the bottom 376 meets each of the sides 374 are corners 379. At each corner 379 are the notches 378. The notches 378 are shown in both FIGS. 8 and 9. By placing the notches 378 at the corners 379, the corners 379 can no longer be rounded, as they were in the devices shown in FIGS. 3–4. This is because the notches 378 cause the physical structure of the corners 379 to be removed. That is, without the structure of a corner, the fabrication process will not produce a rounded shape at the corner. As such, the positioning of the mirror structure 360 relative to the latch 390 will not be as variable as it is in the prior devices.

Although typical fabrication methods still produce rounded corners within the notches 378, this causes no adverse effect on the positioning of the mirror structure. By being located across the bottom 376 and over the notches 378, the latch 390 is provided with a flat and even surface, as shown in FIG. 9. This uniform surface greatly improves the positioning of the mirror structure. Also, because of the sizing of the notches 378 relative to the much larger center portion 393 of the latch 390, no part of the center portion 393 can contact the rounded corners of the notches 378.

The notches 378 can be positioned anywhere at the corners 379, so long as the structure at or about, what would be the intersection of the edge 374 and bottom 376, is removed. As shown in FIGS. 8 and 9, in a preferred embodiment, the notches 378 are positioned on the bottom 376 at the side edges 374. However, in alternate embodiments, the notches 378 can be placed on the side edge 374 at the bottom 376. In another embodiment, a notch can be positioned over both the bottom and side edge portions of the corners 379, about where the bottom 376 and side edges 374 would otherwise intersect. Also, in yet another embodiment, more than one notch can be used at each corner, such that no physical structure exists about the intersection of the corner 379. For example, a first notch can be placed on the bottom 376 at the side edge 374 and a second notch can be placed on the side edge 374 at the bottom 376.

The notches 378 can also be of any shape and configuration so long as they remove sufficient material at the corners 379 to prevent the production of rounded corners during fabrication. Although it is preferred to employ a generally rectangular shape, the notches could be of any polygon or even an elliptical or circular shape.

One of the mirror latches 390 is shown in FIG. 7. In the one embodiment, the switch 300 has two mirror latches 390 set between the actuator arm 330 and each side 364 of the mirror structure 360, as shown in FIG. 5. The mirror latches 390 function to set and retain the mirror structure 360 in a specific fixed location.

The latches 390 can be made of any suitable thin film material, including polycrystalline silicon and oxide. However, polycrystalline silicon at an uniform thickness of about 1.5 $\mu$m is preferred. Also, preferably the latches 390 are constructed from the poly 2 layer 460, as shown in FIGS.

10 and 11 and as discussed below. Although the material used for the latches 390 does not have to be electrically conductive, to avoid retaining a charge in the switch 300, it is preferred that the material used is conductive. Retaining a charge in the switch 300 is preferably avoided because the charge could prevent the switch from actuating.

As noted, during fabrication the mirror structure 360 is raised from its initial flat position up to a fixed upright position. The latches 390 are fabricated initially flat, being connected at their anchors 391 to the actuator arm 330 and extending out over the catches 370. As the mirror structure 360 is raised up it contacts the latches 390 at each catch 370. Then, the latches 390 are raised along with the mirror structure 360, until the mirror structure 360 reaches its upright position. At that point the catches 370 receive the fasteners 395 and the mirror structure 360 is locked into place.

As shown in FIG. 7, the length of each latch 390 is divided between the inboard portion 392, the center portion 393 and the outboard portion 394.

The inboard portion 392 is set between the anchor 391 and the center portion 393. Although the inboard section 392 can be any of a variety of configurations, in some embodiments it is narrower near the anchor 391 and wider near the center portion 393. Preferably, the inboard portion 392 is divided into two sections, a flexure 392a and stiffener 392b, as shown in FIGS. 6 and 7. The inboard portion 392 must be flexible enough to bend as the mirror structure 360 is brought up to its upright position. This is accomplished by the flexure 392a, which is narrow enough to allow it to deform amply to allow the latch 390 to be raised from above the actuator arm 330 to the catches 370. The specific dimensions of the flexure 392a can vary depending on the requirements of the use. In at least one embodiment, the flexure 392a runs about half the length of the inboard portion 392, as shown in FIGS. 6 and 7. As the mirror structure 360 is raised, the outboard portion of the latch 390 will raise up as well and the latch 390 will deflect at the flexure 392a. The flexure 392a also functions to provide a biasing force to urge the center portion 393 and the outboard portion 394 downward. This biasing force helps to keep the latch 390 against the catch 370 as the mirror structure 360 is raised and in the catch 370 after the mirror structure 360 reaches its upright position. As shown in FIG. 6, with the latch 390 connected in the catch 370, the flexure 392a will be deflected.

The inboard portion 392 must also be stiff enough not to overly deform as the mirror structure 360 is raised. As shown in FIGS. 6 and 7, the stiffener 392b provides the desired stiffness by being wider than the flexure 392a. The exact dimensions of the stiffener 392b can vary depending on the use, but it should be wide enough to provide sufficient stiffness to prevent undesired deformation of the latch 390 and to help keep the latch 390 locked into the catch 370.

As shown in FIG. 7, the center portion 393 of the latch 390 must be narrow enough to be received in the lower trench 377 (not shown), but broad enough to provide sufficient strength and stiffness to the structure of the latch 390, to prevent breakage or undesired deformations of the latch 390. The center section 393 must also be broad enough to provide sufficient flatness to prevent undesired positioning of the mirror structure 360. The center portion 393 is defined by the fasteners 395, which are positioned on either side of the center portion 393. As shown in FIG. 9, when the mirror structure 360 is in its upright position, and the latch 390 in received into the catch 370, the center portion 393 rests upon the bottom portion 376 and between the side edges 374. Since, as noted in detail above, the bottom 376 is substantially flat and the corners 379 are not rounded, the center portion 393 can be positioned with a high degree of precision. As a result, the present invention has the significant advantage of allowing the mirror 380 to be positioned with greater accuracy than that provided by prior devices. This improved mirror positioning accuracy results in a greatly reduced number of switch failures due to misalignment of the reflected beam with the receiving fiber. As such, higher switch production yields can be obtained with the present invention.

Turning back to FIG. 7, the outboard portion 394 of the latch 390 functions to support the latch 390 on the catch 370 (not shown in FIG. 7), allowing the latch 390 to slide along the catch 370 as the mirror structure 360 (not shown) is raised. The outboard portion 394 rests upon and slides across the upper edges 373 (not shown) of the shoulders 372 (not shown) as the mirror structure 360 is raised. The outboard portion 394 then drops behind the shoulders 372 when the center portion 393 drops into the lower trench 377, as shown in FIG. 9.

The size, length and shape of the outboard portion 394 can vary depending on the specifics of the design. It is preferred that the outboard portion 394 is long enough so that it is received in the upper trench 375 as the mirror structure 360 is brought up to first contact the latch 390. Also, preferably, the outboard portion 394 is wide enough to initially rest on the upper edges 373 and to later lock behind the shoulders 372, as the center portion 393 is received in the lower trench 377. Further, the outboard portion 394 must be narrow enough to be received within the upper trench 375. The outboard portion 394 must also be strong and stiff enough to allow the mirror structure 360 to be raised without damaging or overly deforming the latch 390.

As previously noted, the latch 390 is kept over the catch 370 by the guide 366, as the mirror structure 360 is raised. As such, to allow the latch 390 to be locked into the catch 370, the positioning and size of the outboard portion 394 relative to the center portion 393 must be such that the center portion 393 will be received into the lower trench 377 regardless of the position of the outboard portion 394 in the upper trench 375. This must be true even if the outboard portion 394 has moved over to contact either wall 371.

As shown in FIG. 7, the fasteners 395 of the latch 390 are positioned on either side of the center portion 393. The fasteners 395 function to receive the shoulders 372 (not shown) to lock the latch 390 into the catch 370, as shown in FIG. 9. As shown in FIG. 7, each fastener 395 includes a support edge or support surface 396, an inside edge or side surface 397 and a notch 398.

The support edge 396 is the portion of the fastener 395 which rests upon the shoulder 372 when the latch 390 is locked in the catch 370. As such, it is preferred that the surface of the support edge 396 be relatively flat and uniform. This provides accurate positioning of the mirror structure 360 relative to the latch 390.

Set at the intersection of the support edge 396 and the inside edge 397 at a corner 399 is notch 398. As with the notch 378 of the catch 370, the notch 398 functions to remove the rounded shape which would otherwise exist at the corner 399. As previously noted, the rounding of corners is an inherent result of etching a corner during the fabrication process. By placing the notch 398 at or about the corner 399, no physical structure exists which would otherwise allow a rounded corner to be created. Instead, an effective right angle is created at the corner 399. The fabrication process does round the corners of the notch 398, but as can be see, this has no effect on the positioning of the latch 390 relative to the catch 370.

With the notches 398 placed on the support edge 396, the width of the notches 398 are preferably limited so that the support edge 396 still retains sufficient surface area for contacting the shoulder 372.

The primary benefit obtained by use of the notches 398 is that since the corners 399 are not rounded, the positioning of the latch 390 contacting the mirror structure 360 is significantly more precise. That is, the mirror 380 can be positioned with much greater accuracy. Also, the deviations of the positions of a run of mirrors during fabrication is minimized. Resulting in an increase in the overall production yield of switches.

Of course, as with the notches 378, the notches 398 can be placed in any of a variety of positions at or about the corners 399. Also, the notches 398 can be any of a variety of shapes. It is preferred however, that the notches 378 be positioned on the support edge 396 at the inside edge 397 and that the notches 398 have a rectangular or square shape.

While it is preferred that embodiments includes notches 378 on the catch 370, and notches 398 on the latch 390, just one of the set of notches can be used in alternate embodiments. That is, just the notches 378 can be used, leaving the corners 399 rounded, or just the notches 398 can be employed, with the corners 379 left rounded. Although this does not tend to provide as accurate positioning as the use of both sets of notches, it nevertheless provides greater precision than both rounded corners of other devices.

In other alternate embodiments, the switch 300 can be configured to have just one latch 390 as opposed to the preferred two latches 390. Similarly, in alternate embodiments just one shoulder 373 can be used in the catch or catches 370 and/or just one fastener 395 can be used on the latch or latches 390. Obviously, any combination of the above alternates and the preferred embodiment can be utilized.

In still another embodiment, the positioning of the latch 390 and the catch 370 is reversed. As shown in FIG. 10, in this embodiment the anchor 391' of the latch 390' is connected to the side 364 of the mirror structure 360 and the latch 390' extends over the mirror hinge 350 and the main actuator arm 334. Positioned on the arm 334 is the catch 370' which is positioned and sized to receive and retain the latch 390' as the mirror structure 360 is raised.

In other alternate embodiments, the above latch 390 and catch 370 mechanism is used to connect and lock other switch components. For example, the above latch 390 and/or catch 370 can be used to replace the actuator latch 340. This use will provide improved positioning of the main arm portion 334 relative to the backflap 332.

Other alternate embodiments of the present invention include use in other MEMS structures. For example, any MEMS structure which requires holding at least two surfaces in a position angled to one another, the present invention can be used. The present invention is especially useful for precision positioning of a set or run of structures with minimum positioning deviation during manufacture.

One other alternate embodiment of the switch, has the structural layers (e.g. poly 0, poly 1 and poly 2) made of an oxide material (e.g. tetraethylorthosilicate or TEOS), in place of the polycrystalline silicon as used in the embodiments described above. The structural shape and positioning of components in this alternate embodiment otherwise can remain the same as describe above.

Some Embodiments of the Method of the Invention

The method of the present invention is embodied in a method for fabricating an optical switch. The method provides a straight forward and reliable means of fabricating an optical switch with highly accurate mirror positioning. This accuracy reduces the potential for misalignment of the reflected beam with the receiving optical fiber. This, in turn, increases the production yields of optical switches.

In at least one embodiment the method 500 includes the steps of forming a lower poly layer 510, etching the lower poly layer to define a first structure and a second structure 520, applying a middle oxide layer 530, etching the oxide layer 540, applying a top poly layer 550, etching the top poly layer to define a latch having fasteners with notches 560, removing the oxide layer 570, moving the second surface relative to the first surface 580, engaging the latch to maintain the position of the first structure relative to the second structure 590. These steps are shown in FIG. 13.

Figure 13:
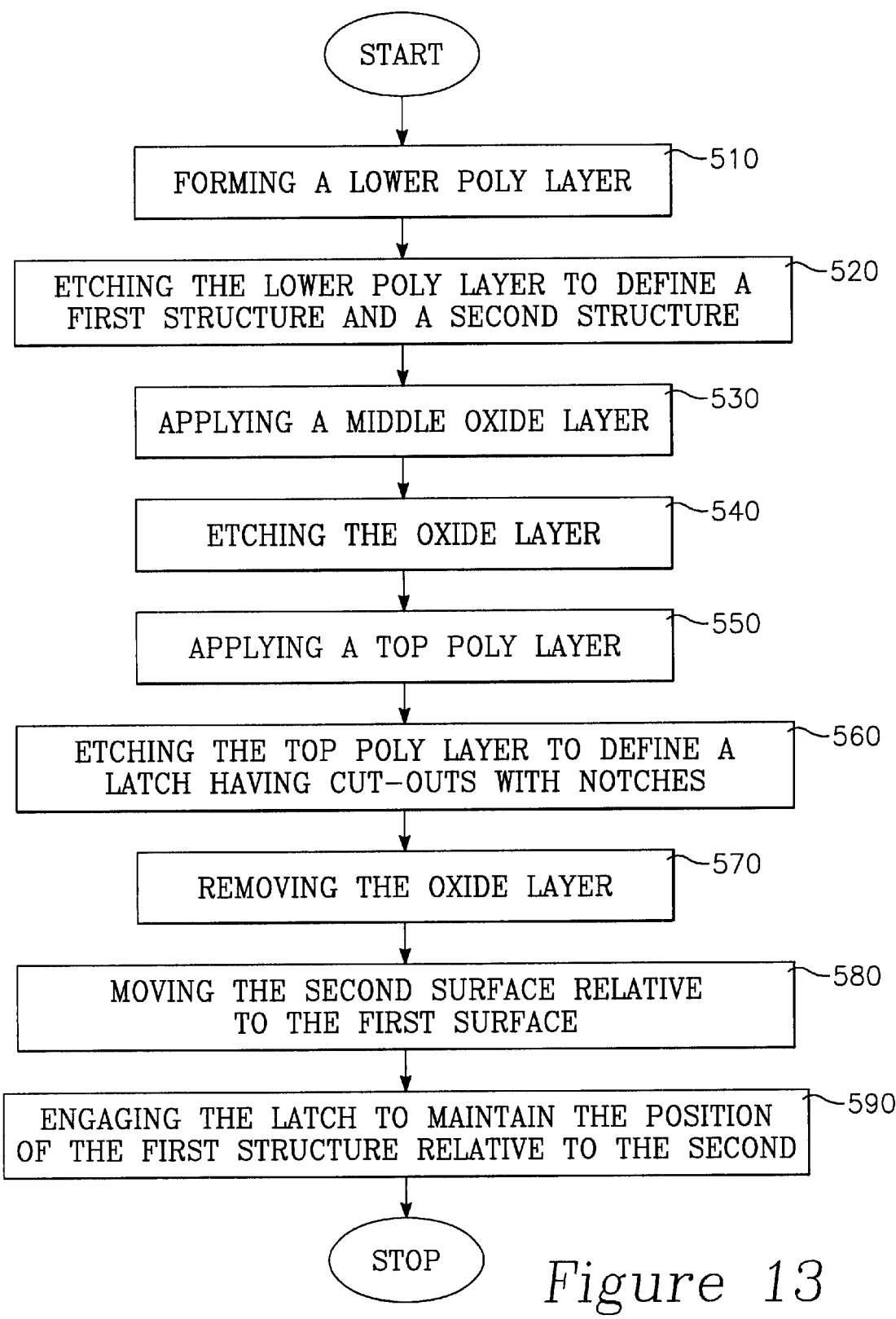
FIG. 13 is a chart of a method in accordance with an embodiment of the present invention.

The step of forming a lower poly layer 510 is shown in FIG. 13. In a preferred embodiment, prior to performing this step, the steps of providing a substrate 502, forming an insulation layer 503, forming a poly 0 layer 504, etching the poly 0 layer 506, forming an lower oxide layer 508 and etching the oxide layer 509 are performed. These steps are shown in FIG. 14.

Figure 14:
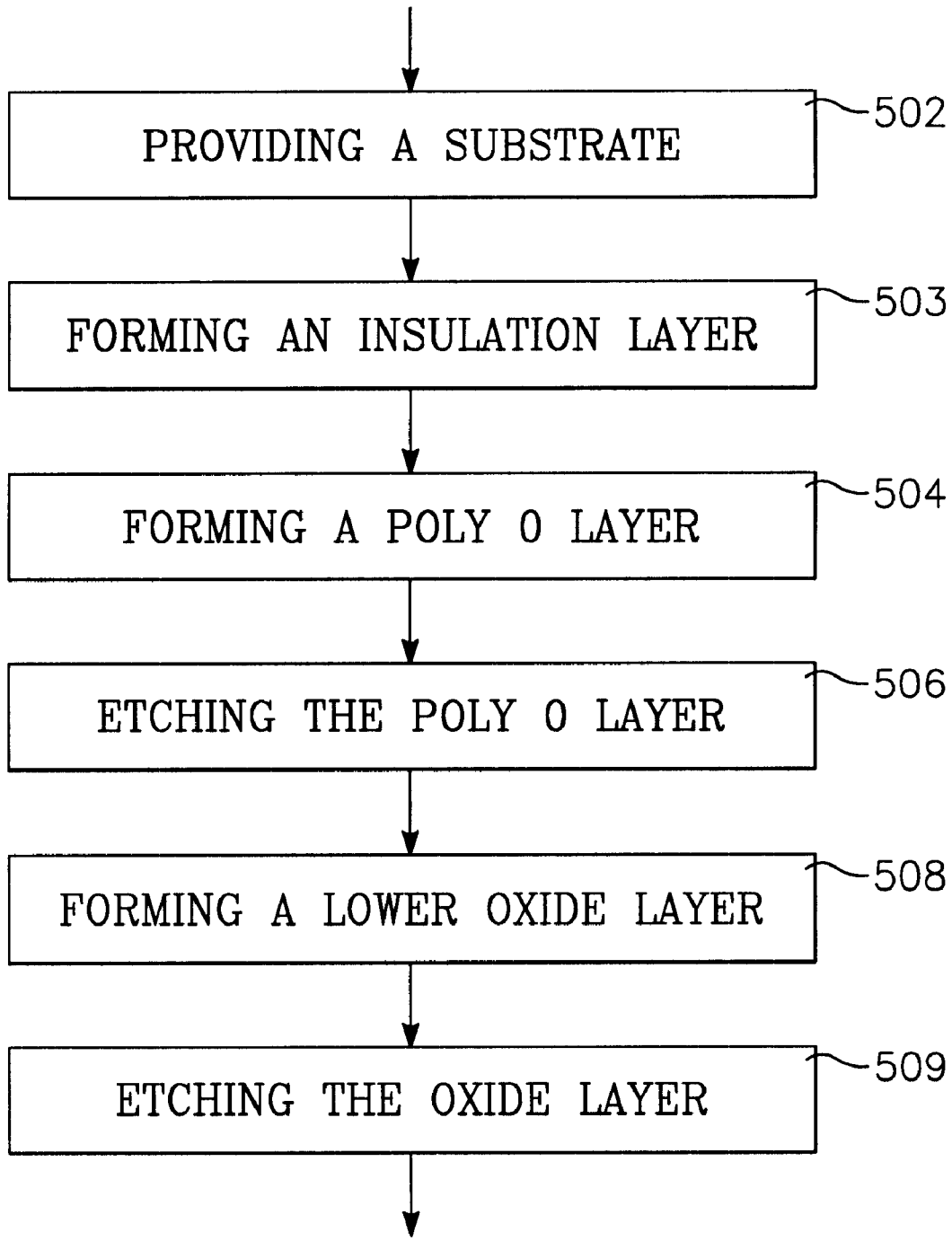
FIG. 14 is a chart of a method in accordance with an embodiment of the present invention.

The step of providing a substrate 502 is shown in FIG. 14. Preferably, the substrate 410 is a layer of single-crystal silicon 675 $\mu$m thick. The substrate 410 functions to provide a structural base for the switch 300. The substrate 410 can be deposited by any well known method.

Figure 12:
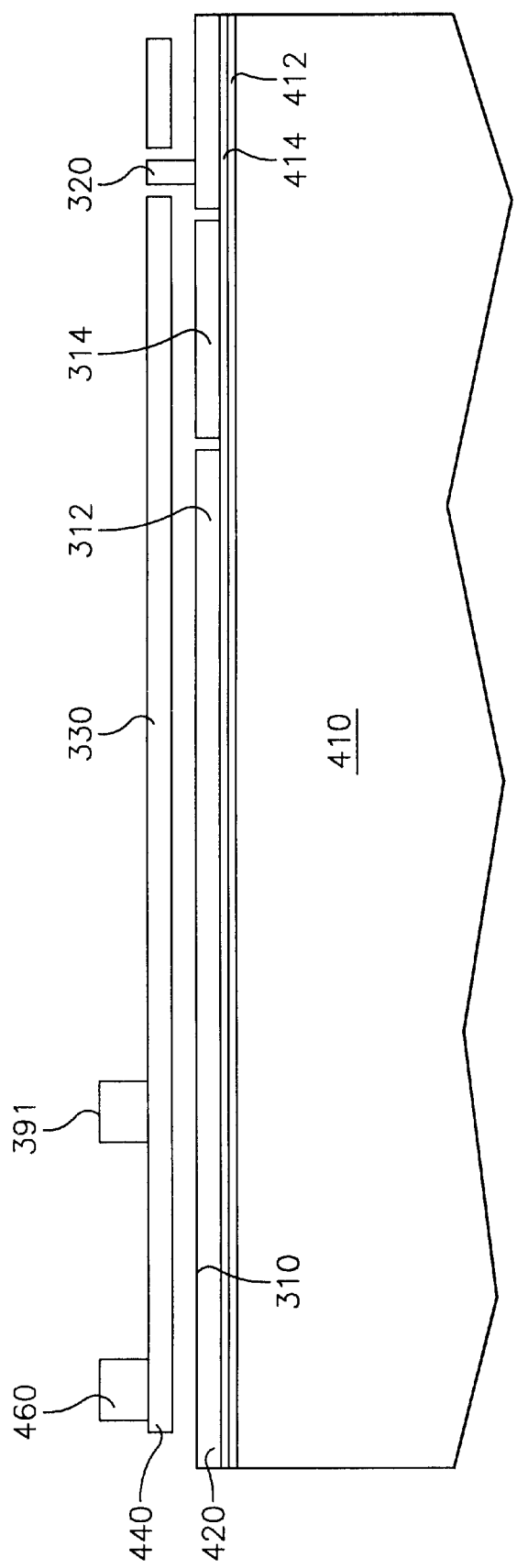
FIG. 12 is a side cross-section of layers of material in accordance with an embodiment of the present invention.

Next, it is preferred that an insulation layer is applied in the step of forming an insulation layer 503. This step is shown in FIG. 14. In the preferred embodiment the insulation layer includes a silicon dioxide ($SiO_2$) layer 412 which is 0.63 $\mu$m thick. This $SiO_2$ layer 412 functions as an electrical insulator between the substrate 410 and the poly 0 layer 420. On top of the $SiO_2$ layer 412 is preferably deposited a 0.8 $\mu$m thick layer of low-stress silicon nitride (SiNx) layer 414. This layer acts as an etch stop to protect the $SiO_2$ layer 412 during etching. The process of applying both the $SiO_2$ layer 412 and the SiNx layer 414 are well known to one skilled in the art. These layers are shown in FIG. 12.

The next step is forming a poly 0 layer 504, as shown in FIG. 14. The poly 0 layer 420 can be deposited by any method well known in the art including sputtering. The poly 0 layer 420 is preferably a doped polycrystalline silicon (Si) 0.5 $\mu$m thick.

Figure 11A:
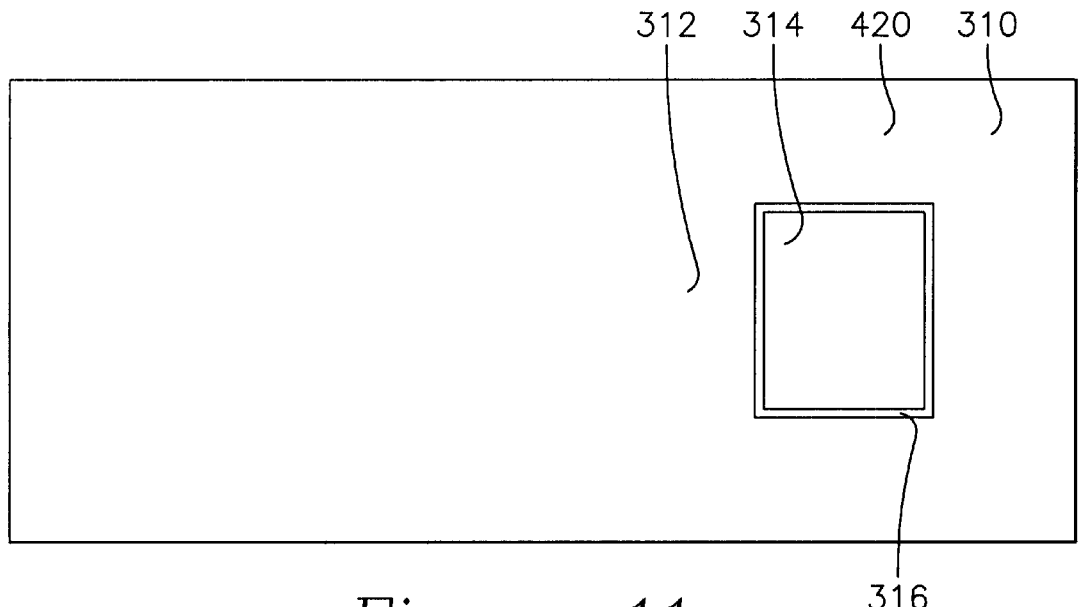
FIGS. 11a–f are a top views of layers of material in accordance with an embodiment of the present invention.

As FIGS. 11a and 14 show, the next step is etching the poly 0 layer 506. This step can be performed by any of a variety of well known in the art photolithography and etching methods. For example, after applying an oxide mask, the poly 0 layer can be etched by a dry etching process such as reactive ion etching (RIE). It is preferred that the poly 0 layer 420 is etched to define a shield 312 and a surface electrode or actuator 314. The shield 312 and electrode 314 are separate from one another to allow different voltages to be applied to each. This allows the later applied actuator arm 330 may be raised and lower by attracting it to, or repelling it from, the actuator 314.

After the poly 0 layer 420 has been etched, the step of forming a lower oxide layer 508 is performed. This step is shown in FIG. 14. The oxide layer 430 is preferably a tetraethylorthosilicate or TEOS formed to a thickness of 2.0 $\mu$m. Application of an oxide layer, such as the lower oxide layer 430, can be done by any of a variety of processes well known in the art.

Figure 11B:
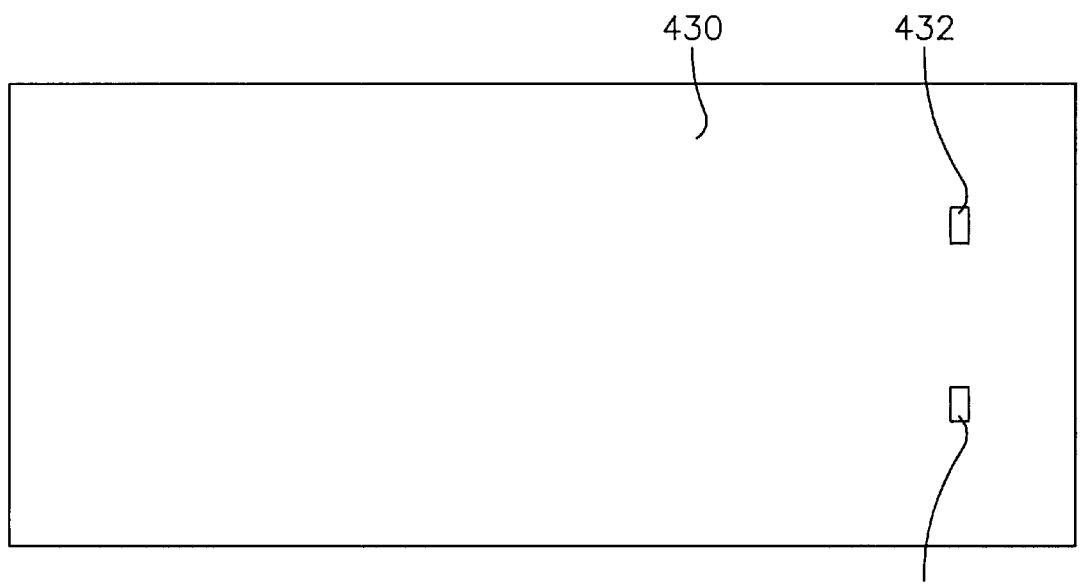

Then, the oxide layer 430 is etched in the step of etching the oxide layer 509, as shown in FIGS. 11b and 14. During this step, the oxide layer is etched to open vias 432 through the oxide layer 430 to the Poly 0 layer 420. It is preferred that a photoresist mask is applied to define the vias for etching. The etching can be performed by any suitable method well known in the art. It is preferred, however, that the etching is a wet etch, where the wafer is immersed in a bath of hydrofluoric acid (HF) to remove the undesired portions of the oxide layer.

The vias 432 function to allow the connection of structures between the poly 1 layer 440 (not shown) and the poly 0 layer 420. Preferably, the later applied actuator arm hinge 320 is connected to the poly 0 layer 420.

Next, is the step of forming a lower poly layer 510. This step is shown in FIG. 13. This step can be performed by any process well known in the art. While a variety of materials can be used, it is preferred that the poly 1 layer 440 is deposited. Also it is preferred that the poly 1 layer 440 is a doped polycrystalline silicon (Si) 1.0 $\mu$m thick.

Figure 11C:
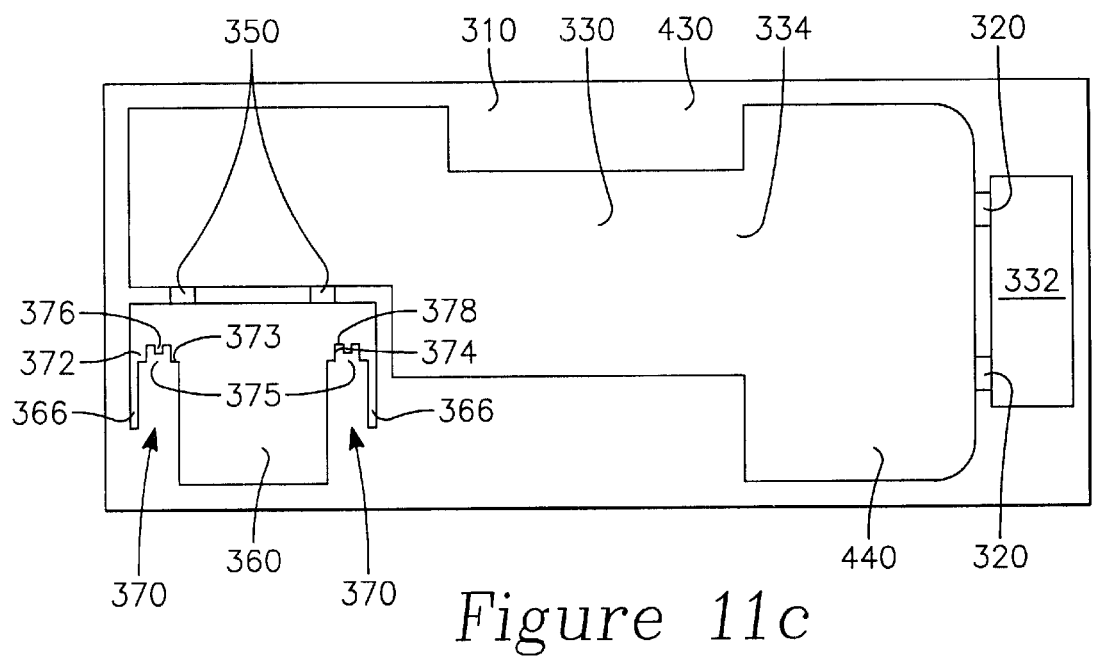

The next step of the method 500 is etching the base poly layer to define a first structure and a second structure 520. This step is shown in FIGS. 11c and 13. Although the first and second structures can be of any configuration, it is preferred that the first structure is the actuator arm 330 and the second structure is the mirror structure 360. In the preferred embodiment, the mirror hinge 350 is etched to connect the mirror structure 360 to the actuator arm 330.

Preferably, the actuator arm hinge 320 is etched to be positioned between the main arm portion 334 and the backflap 332. Further, that the actuator arm hinge 320 is positioned over and extends through the vias 430 to the poly 0 layer 420.

It is also preferred that within the mirror structure 360 are etched the guides 360 and the catches 370. The catches 370 each including the walls 371, upper edges 373, upper trench 375, edges 375, bottom 376, lower trench 377 and notches 378.

The etching of the base poly layer can be performed by any suitable etching methods known in the art, but the process of applying an oxide mask and dry etching is preferred. A preferred dry etching process is reactive ion etching (RIE). To define the components in the poly 1 layer 440, the etching should at least pass through the poly 1 layer.

As shown in FIG. 13, the next step of the method 500 is the step of applying a middle oxide layer 530. Again, this step can be accomplished with any known suitable deposition method. It is preferred that the middle oxide layer 450 is either a tetraethylorthosilicate or TEOS which is deposited to a thickness of 0.5 $\mu$m.

Figure 11D:
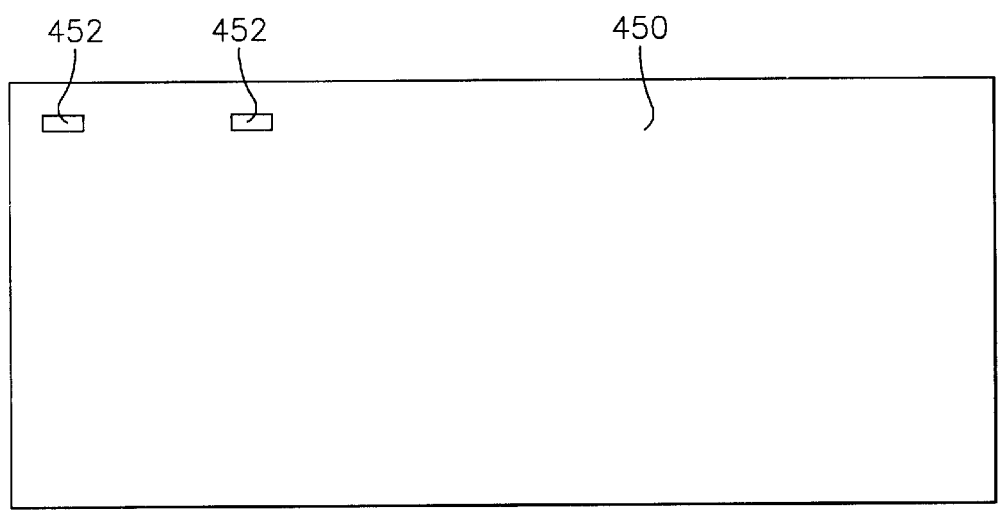

Then during the step of etching the oxide layer 540, vias 452 are created. This step is shown in FIGS. 11d and 13. The vias 452 are etched through the oxide layer 450 to the actuator arm 330 on the poly 1 layer 440. As with the other oxide layer etching, the etching in this step can be performed by any suitable known etching method, preferably by a wet etch, with the wafer immersed in a bath of hydrofluoric acid (HF) to remove the undesired portions of the oxide layer.

Next, as shown in FIG. 13, the step of applying a top poly layer 550 is performed. It is preferred that during this step that the poly 2 layer 460 is applied over the middle oxide layer 450 and through the vias 452 to the actuator arm 330. As with the deposition of the other poly layers, the deposition of the top poly layer 460 can be performed by any acceptable known. Although the top poly layer can be deposited to any of a variety of thicknesses, it is preferred that the layer is deposited to a thickness of 1.5 $\mu$m. Also, the preferred material for the poly 2 layer 460 is a doped polycrystalline silicon (Si).

Figure 11E:
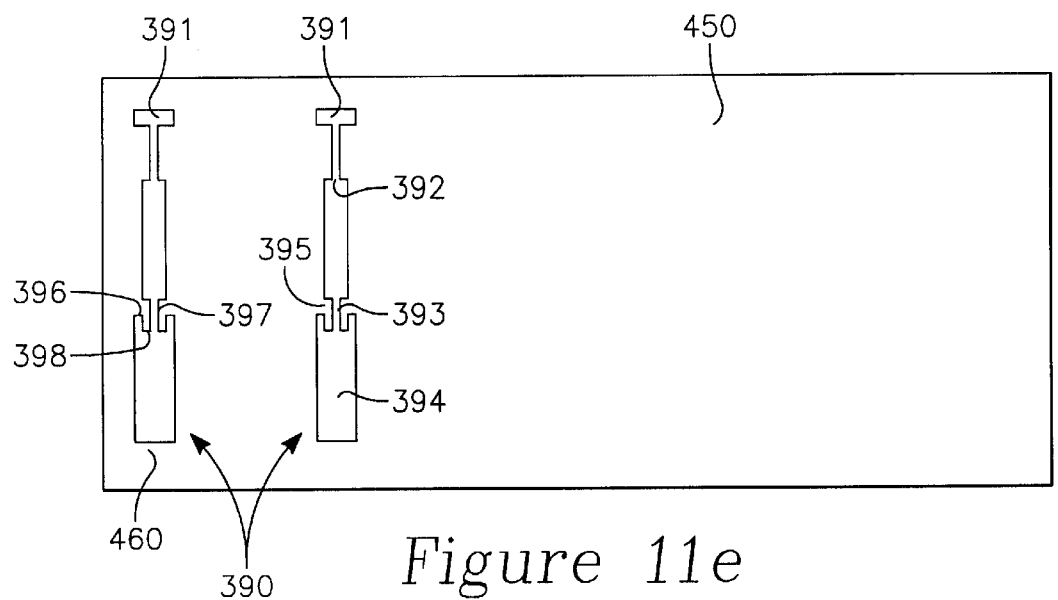

Then, the step of etching the top poly layer to define a latch having fasteners with notches 560 is performed. This step is shown in FIGS. 11e and 13. It is preferred that the latches 390 are etched during this step. The latches 390 are etched to include the anchor 391, the inboard portion 392, the center portion 393, the outboard portion 394 and the fasteners 395. Preferably, each anchor 391 is positioned above each via 452, so as to be connected to the actuator arm 330. The fasteners 395 in turn each include support edge 396, inside edge 397 and notch 398. This etching step can also be carried out by any suitable known photolithography and etching methods. As with the etching of the other poly layers the preferred method here is applying an oxide mask and dry etching. Further the preferred dry etching process is reactive ion etching (RIE). During this etching step, the etching should be through the poly 2 layer 460 to the middle oxide layer 430.

Figure 11F:
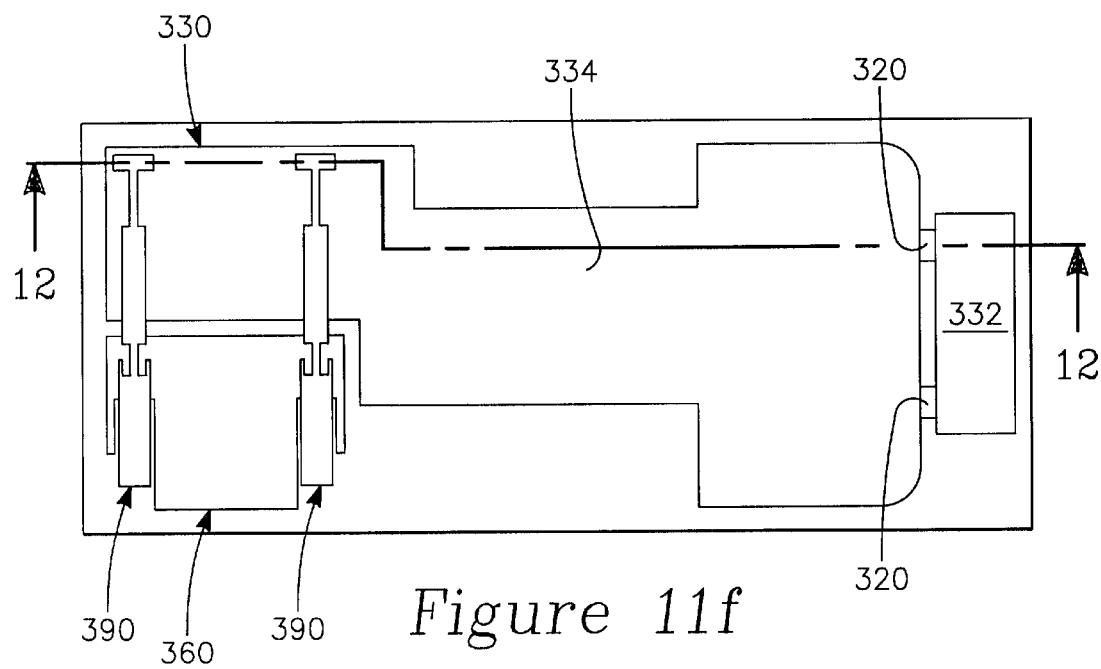

As shown in FIGS. 11f and 13, the next step is removing the oxide layer 570. In the preferred embodiment this step includes removing both the lower oxide layer 430 and the middle oxide layer 450. This step can be achieved by any acceptable method known in the art for removing oxide layers. In the preferred embodiments the oxide layers are removed by immersing the wafer in a bath of hydrofluoric acid (HF).

In some embodiments once the oxide layers are removed, the poly 1 layer 440 will be connected to the poly 0 layer 420 only at the hinge 320. Likewise, the poly 2 layer 460 will be connected to the poly 1 layer 440 only at the anchor 391 of the latch 390, with the latches 390 sitting above the catches 370.

Next, the step of moving the second structure relative to the first surface 580 is performed, as shown in FIG. 13. In the preferred embodiments, during this step the mirror structure 360 is raised by placing a probe under the mirror structure 360 and lifting the structure. As the mirror structure 360 is raised it rotates about the hinge 350. As this occurs the latches 390 are first received by the catches 370 and then guided by the guides 366 over the catches 370. Specifically, the outboard portions 394 are received by the upper trenches 375. Then, as the mirror structure 360 is raised further, the catches 370 (at upper edges 373) slide along underneath the outboard portions 394 until reaching the center portions 393.

In the preferred embodiments, the main actuator arm 334 is also raised up by a probe. This occurs during the step of erecting the actuator arm 584. During this step a probe is placed under the main actuator arm 334 and it is raised until the actuator latches 340 lock into the arm 334, securing the backflap 332 to the arm 334 in a fixed position.

The last step of the method 500 is engaging the latch to maintain the position of the first structure relative to the first 590. This step is shown in FIG. 13.

In some embodiments, when the catches 370 reach the center portions 393, as the mirror structure 360 is raised to its desired position, the center portion 393 drops into the lower trench 377. The center portion 393 is aided into moving into the lower trench 377 by the biasing force created by the deformation of the latch 390 (primarily from the inboard portion 392). The latch 390 is deformed as the it is raised up by lifting and rotating the mirror structure 360 upward. At this point, the center portion 393 rests upon the flat surface of the bottom 376. The bottom 376 being flat because the notches 378 prevent the formation of rounded corners at the sides of the bottom 376. The lack of rounded corners allows more accurate positioning of the latches 390 in the catches 370. This results in a more precise positioning of the mirror structure 360, and as a result, of the mirror 380.

The center portion 393 received in the lower trench 377 of the catch 370 is shown in FIG. 9.

Also in the preferred embodiments, as the center portion 393 is received into the lower trench 377, the support edges 396 are positioned to rest upon the shoulders 372. The flat support edges 396 are maintained in position against the shoulders 372 by the biasing forces created by the deflection of the mirror hinge 350. That is, the deflected hinge 350 produces a biasing force which urges the catch 370 against the support edges 396.

Again, here notches are employed to improve the accuracy of the positioning of the latches 390. Specifically, the notches 398 are positioned at the intersection of the support edges 396 and the inside edges 397. The notches 398 eliminate rounded corners at the intersection of the support edges 396 and inside edges 397. This provides substantially flat surface at the support edge 396. The flat surface in turn provides improved precision in the positioning of the latch 390 relative to the catch 370.

Therefore, the inclusion of the notches 398 results in increased accuracy of the positioning of the latches 390, and as such of the mirror structure 360. Of course, improving the accuracy of the positioning of the mirror structure 360 results in an equal improvement in the positioning of the mirror 380.

Thus, the inclusion of the notches 378 and notches 398 provides the advantage of increased mirror positioning accuracy, and reduced deviation therefrom. This results in improved device performance and increased fabrication yields due to reduced failures from misalignment of the reflected beam with the receiving optical fiber.

In an alternate embodiment of the method 500, the switch is fabricated by using an oxide material (e.g. tetraethylorthosilicate or TEOS) in place of the polycrystalline silicon used in the poly 0 layer 420, the poly 1 layer 440 and the poly 2 layer 460. Likewise, the oxide layers are be replaced with a polycrystalline silicon materials. In this embodiment, the poly layers are the sacrificial layers and the oxide layers are the structural layers of the fabricated switch. The poly layers are still etched by a dry etch, such as reactive ion etching (RIE) with oxide masks and the oxide layer are etched with a wet etch, such as a hydrofluoric acid (HF) bath, with photoresist masks.

Figure 15:
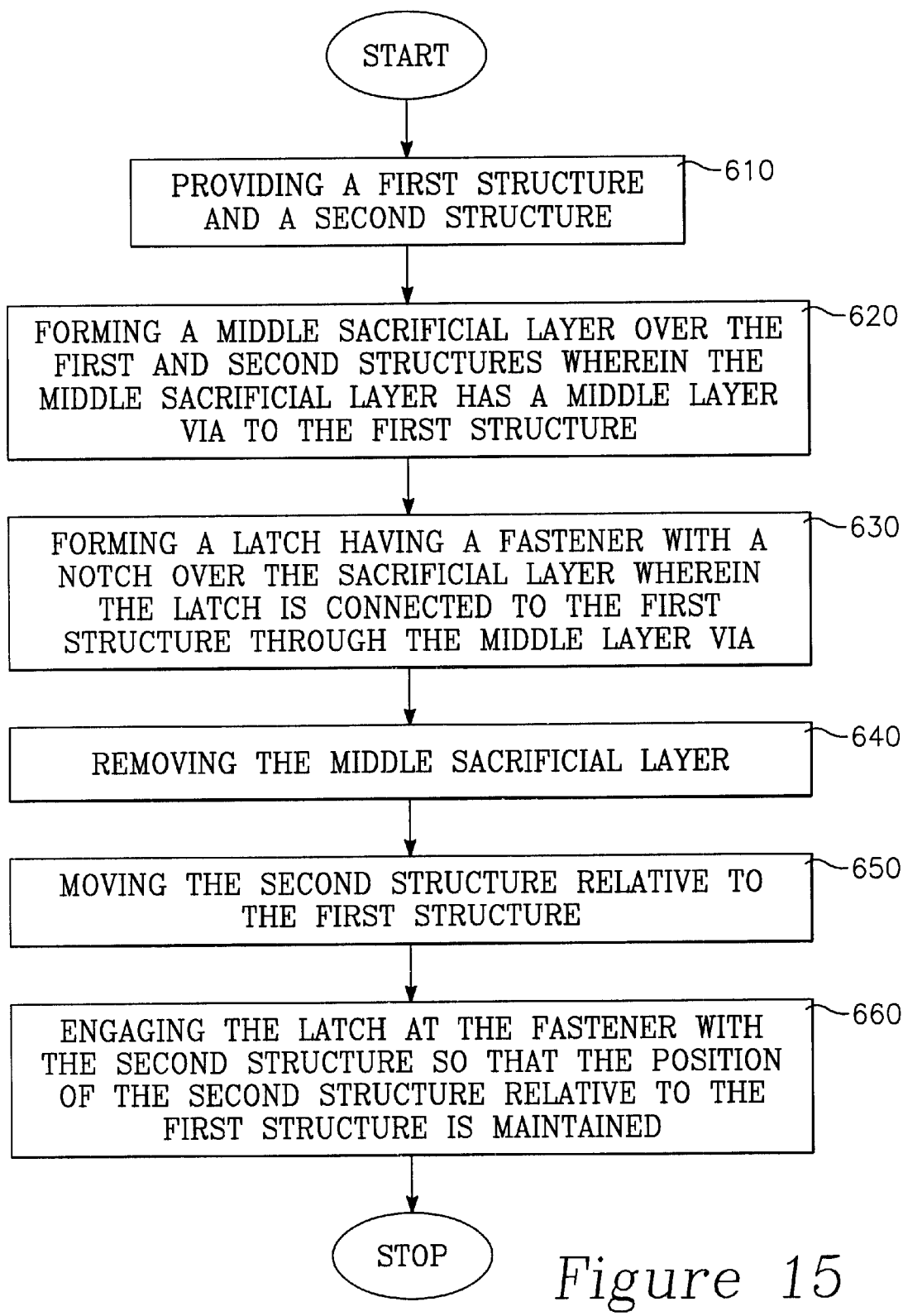
FIG. 15 is a chart of a method in accordance with an embodiment of the present invention.

As shown in FIG. 15, another embodiment of the invention is method 600 which includes: providing a first structure and a second structure 610, forming a middle sacrificial layer over the first and second structures wherein the middle sacrificial layer has a middle layer via to the first structure 620, forming a latch having a fastener with a notch over the sacrificial layer wherein the latch is connected to the first structure through the middle layer via 630, removing the middle sacrificial layer 640, moving the second structure relative to the first structure 650, and engaging the latch at the fastener with the second structure so that the position of the second structure relative to the first structure is maintained 660.

In one more alternate, in place of the insulating layer an additional oxide layer is used.

While the preferred embodiments of the present invention have been described in detail above, many changes to these embodiments may be made without departing from the true scope and teachings of the present invention. The present invention, therefore, is limited only as claimed below and the equivalents thereof.

What is claimed is:

1. A thin film structure comprising:
 a. A first structure;
 b. A second structure; and
 c. A latch mounted between the first structure and the second structure, wherein the latch has a first end mounted to the first structure and a fastener connected to the second structure, wherein the fastener has a fastener support surface and a fastener side surface, wherein the fastener support surface is in contact with the second structure, wherein the fastener support surface and the fastener side surface are angled to each other to define a fastener corner, wherein the fastener has a fastener notch positioned at the fastener corner.

2. The thin film structure of claim 1, wherein the fastener notch is positioned on the fastener support surface and adjacent the fastener side surface.

3. The thin film structure of claim 2 wherein the fastener support surface is substantially planar.

4. The thin film structure of claim 3, wherein the fastener notch is substantially rectangular.

5. The thin film structure of claim 4, wherein the fastener side surface is substantially perpendicular to the fastener support surface.

6. The thin film structure of claim 1, wherein the fastener notch is positioned on the fastener side surface adjacent the fastener support surface.

7. The thin film structure of claim 1, wherein the fastener notch is positioned at the fastener corner on the fastener support surface and on the fastener side surface.

8. The thin film structure of claim 1 wherein the fastener support surface is substantially planar.

9. The thin film structure of claim 1, wherein the first structure and the second structure are angled to each other.

10. The thin film structure of claim 9, wherein the second structure is substantially perpendicular to the first structure.

11. The thin film structure of claim 10, wherein the second structure further comprises a mirror and the first structure is an actuator arm.

12. The thin film structure of claim 1, wherein the second structure further comprises a catch and wherein the latch is received by the catch.

13. The thin film structure of claim 12, wherein the catch has a catch support surface and a catch side surface and wherein the catch support surface receives the latch.

14. The thin film structure of claim 12, wherein the catch side surface and the catch support surface are angled to each other to define a catch corner, wherein the catch has a catch notch positioned at the catch corner.

15. The thin film structure of claim 14, wherein the catch support surface is substantially planar.

16. The thin film structure of claim 15, wherein the catch notch is positioned on the catch support surface adjacent the catch side surface.

17. The thin film structure of claim 15, wherein the catch notch is positioned on the catch side surface adjacent the catch support surface.

18. The thin film structure of claim 15, wherein the catch notch is positioned on the catch support surface and on the catch side surface.

19. The thin film structure of claim 1, wherein the second structure further comprises a catch, wherein the catch has a catch support surface and a catch side surface, wherein the catch support surface receives the latch near the latch side surface, and wherein the fastener support surface receives the second structure near the catch side surface.

20. The thin film structure of claim 19, wherein the catch side surface and the catch support surface are angled to each other to define a catch corner, wherein the catch has a catch notch positioned at the catch corner, wherein the catch support surface is substantially planar.

21. The thin film structure of claim 20, wherein the catch notch is positioned on the catch support surface adjacent the catch side surface.

22. The thin film structure of claim 1, wherein the thin film structure is a MEMS device.

23. A thin film structure comprising:
   a. A first structure;
   b. A second structure having a catch, wherein the catch has a catch support surface and a catch side surface, wherein the catch side surface and the catch support surface are angled to each other to define a catch corner, wherein the catch has a catch notch positioned at the catch corner; and
   c. A latch mounted between the first structure and the second structure, wherein the latch has a first end mounted to the first structure and a fastener received by the catch in the second structure.

24. The thin film structure of claim 23, wherein the catch support surface is substantially planar.

25. The thin film structure of claim 24, wherein the catch notch is positioned on the catch support surface adjacent the catch side surface.

26. The thin film structure of claim 25, wherein the fastener notch is substantially rectangular.

27. The thin film structure of claim 26, wherein the fastener side surface is substantially perpendicular to the fastener support surface.

28. The thin film structure of claim 24, wherein the catch notch is positioned on the catch side surface adjacent the catch support surface.

29. The thin film structure of claim 24, wherein the catch notch is positioned on the catch support surface and on the catch side surface.

30. A MEMS optical switch comprising:
   a. An actuator arm;
   b. A latch mounted to the actuator at a first end and extending out to a fastener, wherein the fastener has a fastener support surface and a fastener side surface, wherein the fastener support surface and the fastener side surface are angled to each other to define a fastener corner, wherein the fastener has a fastener notch positioned at the fastener corner;
   c. A mirror hinge connected to the actuator arm; and
   d. A mirror structure connected to the mirror hinge and positioned at an angle to the actuator arm, the mirror structure having a mirror for reflecting a beam of light, the mirror structure having a catch which receives the fastener of the latch for securing the mirror structure in a fixed position relative to the actuator arm.

31. The MEMS optical switch of claim 30, wherein the fastener notch is substantially rectangular and positioned on the fastener support surface and adjacent the fastener side surface.

32. The MEMS optical switch of claim 31, wherein the fastener support surface is substantially planar and wherein the fastener side surface is substantially perpendicular to the fastener support surface.

33. The MEMS optical switch of claim 32, wherein the catch has a catch support surface and a catch side surface, wherein the catch support surface receives the latch, wherein the catch side surface and the catch support surface are angled to each other to define a catch corner, wherein the catch has a catch notch positioned at the catch corner.

34. The MEMS optical switch of claim 33, wherein the catch notch is positioned on the catch support surface adjacent the catch side surface and wherein the catch support surface is substantially planar.

35. The MEMS optical switch of claim 34, wherein the latch has a first fastener and a second fastener separated by a center portion of the latch, wherein the first fastener has a first fastener support surface, a first fastener side surface in contact with and angled to the first fastener support surface and a first fastener notch positioned on the first fastener support surface at the first fastener side surface, wherein the second fastener has a second fastener support surface, a second fastener side surface in contact with and angled to the second fastener support surface and a second fastener notch positioned on the second fastener support surface at the second fastener side surface.

36. The MEMS optical switch of claim 35, wherein the catch has a first catch side surface, a second catch side surface, a first catch notch and a second notch, wherein the first catch side surface and the second catch side surface are positioned on opposite ends of the catch support surface, wherein the first catch notch and the second catch notch are positioned on opposite ends of the catch support surface, wherein the first catch notch is positioned at the first catch side surface and the second catch notch is positioned at the second catch side surface.

37. The MEMS optical switch of claim 36, wherein the center portion of the latch contacts the catch support surface, wherein the first fastener support surface contacts the catch near the first catch side surface and wherein the second fastener support surface contacts the catch near the second catch side surface.

38. A fabrication method comprising:
   a. Providing a first structure and a second structure;
   b. Forming a middle sacrificial layer over the first and second structures, wherein the middle sacrificial layer has a middle layer via to the first structure;
   c. Forming a latch having a fastener with a notch over the sacrificial layer, wherein the latch is connected to the first structure through the middle layer via, wherein the fastener has a fastener support surface and a fastener side surface, wherein the fastener support surface is in contact with the second structure, wherein the fastener support surface and the fastener side surface are angled to each other to define a fastener corner, wherein the fastener has a fastener notch positioned at the fastener corner, and wherein the fastener support surface is substantially flat;
   d. Removing the middle sacrificial layer;
   e. Moving the second structure relative to the first structure; and
   f. Engaging the latch at the fastener with the second structure so that the position of the second structure relative to the first structure is maintained.

39. The method of claim 38, wherein the second structure has a catch and wherein the latch is received in the catch.

40. The method of claim 39, wherein the catch has a catch support surface and a catch side surface, wherein the catch support surface receives the latch, wherein the catch side surface and the catch support surface are angled to each other to define a catch corner, wherein the catch has a catch notch positioned at the catch corner, and wherein the catch support surface is substantially flat.

41. The method of claim 40, wherein the latch contacts the second structure at the catch support surface and wherein the latch support surface contacts the second structure near the catch side structure.

42. The method of claim 38, wherein the providing a first structure and a second structure further comprises:
   a. Forming a first structural layer; and
   b. Etching the first structural layer to define the first structure and the second structure.

43. The method of claim 42, wherein the step of forming a latch further comprises:
   a. Forming a second structural layer; and
   b. Etching the second structural layer to define the latch.

44. The method of claim 43, wherein the first structural layer is a poly 1 layer and wherein the second structural layer is a poly 2 layer.

45. The method of claim 44 wherein the middle sacrificial layer is a middle oxide layer comprised of an oxide material.

46. The method of claim 45, wherein the method further comprises:
   a. Providing a substrate;
   b. Forming a poly 0 layer;
   c. Etching the poly 0 layer;
   d. Forming a lower oxide layer; and
   e. Etching the oxide layer to form a lower layer vias to the poly 0 layer;
wherein these steps are performed prior to forming the first structural layer.

47. The method of claim 46, wherein the poly 0 layer, the poly 1 layer and the poly 2 layer are each comprised of a polycrystalline silicon material.

48. The method of claim 47, wherein the lower oxide layer and the middle oxide layer are both comprised of a material from the group of tetraethylorthosilicate and TEOS.

49. The method of claim 48, wherein the poly 0 layer is about 0.5 $\mu$m thick, wherein the poly 1 layer is about 1.0 $\mu$m thick, and wherein the poly 2 layer is about 1.5 $\mu$m thick.

* * * * *